US010394798B1

(12) United States Patent
Holenstein et al.

(10) Patent No.: US 10,394,798 B1
(45) Date of Patent: *Aug. 27, 2019

(54) METHOD OF ENSURING TRANSACTIONAL INTEGRITY OF A SYSTEM THAT INCLUDES A FIRST SUBSYSTEM AND A SECOND SUBSYSTEM

(71) Applicant: Gravic, Inc., Malvern, PA (US)

(72) Inventors: Bruce D. Holenstein, Media, PA (US); John R. Hoffmann, Kennett Square, PA (US); Paul J. Holenstein, Downingtown, PA (US); Wilbur H. Highleyman, Blairstown, NJ (US); Dylan R. Holenstein, Media, PA (US)

(73) Assignee: Gravic, Inc., Malvern, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/213,627

(22) Filed: Dec. 7, 2018

Related U.S. Application Data

(63) Continuation of application No. 16/026,442, filed on Jul. 3, 2018, now Pat. No. 10,152,506, which is a
(Continued)

(51) Int. Cl.
*G06F 16/00* (2019.01)
*G06F 16/23* (2019.01)
(Continued)

(52) U.S. Cl.
CPC .......... *G06F 16/2365* (2019.01); *G06F 9/466* (2013.01); *G06F 16/2379* (2019.01); *G06F 16/275* (2019.01); *H04L 67/14* (2013.01)

(58) Field of Classification Search
CPC ............ G06F 16/2365; G06F 16/2379; G06F 16/275; G06F 9/466; H04N 67/14
(Continued)

(56) References Cited

U.S. PATENT DOCUMENTS 7,031,974 B1  4/2006  Subramaniam
7,177,866 B2  2/2007  Holenstein et al.
(Continued)

OTHER PUBLICATIONS

"Amazon Christmas Present—Buy a Pence." Availability Digest; Jan. 2015, Copyright © 2015 Sombers Associates, Inc., and W. H. Highleyman, 4 pages.
(Continued)

*Primary Examiner* — Vincent F Boccio
(74) *Attorney, Agent, or Firm* — Panitch Schwarze Belisario & Nadel LLP

(57) ABSTRACT

A method is provided for ensuring transactional integrity of a system that includes a first subsystem and a second subsystem. The first subsystem receives a request to process a transaction. The first subsystem sends to the second subsystem the request to process a transaction. Each of the subsystems process the identical request. An indicia engine at each subsystem computes indicia of the outcome of the processing of the identical request. The indicia engine at the second subsystem sends its computed indicia to the first subsystem, and the indicia engine at the first subsystem compares its computed indicia with the indicia received from the second subsystem, and sends a transaction abort directive to the second subsystem when the comparison indicates that the computed indicia of the second subsystem does not match the computed indicia of the first subsystem, thereby indicating a lack of transactional integrity in one or both of the first and second subsystems.

4 Claims, 24 Drawing Sheets

Internal structure of the HIE with TD accomplishing the indicia matching

Related U.S. Application Data continuation of application No. 15/890,844, filed on Feb. 7, 2018, now Pat. No. 10,095,730, which is a continuation of application No. 15/701,065, filed on Sep. 11, 2017, now Pat. No. 9,922,074, which is a continuation-in-part of application No. 15/628,354, filed on Jun. 20, 2017, now Pat. No. 9,760,598, which is a continuation-in-part of application No. 14/961,357, filed on Dec. 7, 2015, now Pat. No. 9,734,190.

(51) Int. Cl.
*G06F 16/27* (2019.01)
*G06F 9/46* (2006.01)
*H04L 29/08* (2006.01)

(58) Field of Classification Search
USPC .......................................................... 707/703
See application file for complete search history.

(56) References Cited

U.S. PATENT DOCUMENTS

| | | |
|---|---|---|
| 8,832,050 B2 | 9/2014 | Binkert et al. |
| 8,909,604 B1 | 12/2014 | Holenstein et al. |
| 9,734,190 B1 | 8/2017 | Holenstein et al. |
| 9,760,598 B1 | 9/2017 | Holenstein et al. |
| 9,922,074 B1 | 3/2018 | Hoffmann et al. |
| 2002/0120717 A1 | 8/2002 | Giotta |
| 2004/0133591 A1 | 7/2004 | Holenstein et al. |
| 2004/0169071 A1 | 9/2004 | Burgan et al. |
| 2005/0004916 A1 | 1/2005 | Miller et al. |
| 2005/0235018 A1 | 10/2005 | Tsinman et al. |
| 2009/0049422 A1 | 2/2009 | Hage et al. |
| 2009/0106329 A1 | 4/2009 | Masuda |
| 2009/0300075 A1 | 12/2009 | Guan et al. |
| 2013/0179480 A1 | 7/2013 | Agarwal et al. |
| 2015/0067278 A1 | 3/2015 | Gurumurthi et al. |
| 2016/0149854 A1 | 5/2016 | Foti |

OTHER PUBLICATIONS

Sean Gallagher, "Photos of an NSA "upgrade" factory show Cisco router getting implant." ARS Technica, May 14, 2015, 1 page.

Wikipedia entry for "N-version programming." downloaded from web page: https://en.wikipedia.org/wiki/N-version_programming, download date: Dec. 6, 2015, page last modified: Feb. 15, 2013, 3 pages.

Wikipedia entry for "Malware." downloaded from web page: https://en.wikipedia.org/wiki/Malware, download date: Dec. 6, 2015, page last modified: Dec. 2, 2015, 13 pages.

2014 Verizon Data Breach Investigations Report (DBIR), Copyright © 2014 Verizon, 8 pages.

"Target Compromises Millions of Payment Cards," Availability Digest; Jan. 2014, Copyright © 2013 Sombers Associates, Inc., and W. H. Highleyman, 6 pages.

Definitive Guide to Next-Generation Threat Protection, FireEye white paper, Copyright © 2013 FireEye, Inc., 76 pages.

"Shellshock—the Bash Vulnerability," Availability Digest; Oct. 2014, Copyright © 2014 Sombers Associates, Inc., and W. H. Highleyman, 4 pages.

"First Stuxnet—Now the Flame Virus," Availability Digest; Jun. 2012, Copyright © 2012 Sombers Associates, Inc., and W. H. Highleyman, 4 pages.

"Heartbleed—the Worst Vulnerability Ever," Availability Digest; Apr. 2014, Copyright © 2014 Sombers Associates, Inc., and W. H. Highleyman, 4 pages.

Paul J. Holenstein, Dr. Bruce Holenstein, and Dr. Bill Highleyman, "Breaking the Availability Barrier III." Chapter 16: Active/Active Systems in Practice, AuthorHouse 2007, 11 pages.

"Computers in Spaceflight: The NASA Experience," Chapter 4, downloaded from webpage: http://history.nasa.gov/computers/Ch4-1.html, download date: Dec. 6, 2015, original posting date: unknown, 3 pages.

Wikipedia entry for "Saturn Launch Vehicle Digital Computer," downloaded from web page: https://en.wikipedia.org/wiki/Saturn_Launch_Vehicle_Digital_Computer, download date: Dec. 6, 2015, page last modified: Jun. 14, 2015, 8 pages.

"2015—The Year of the Leap Second," Availability Digest; Feb. 2015, Copyright © 2015 Sombers Associates, Inc., and W. H. Highleyman, 4 pages.

Stuxnet—The World's First Cyber Weapon, Availability Digest; Mar. 2011, Copyright © 2011 Sombers Associates, Inc., and W. H. Highleyman, 5 pages.

Office Action dated Apr. 19, 2018 in U.S. Appl. No. 15/890,844, by Hoffmann.

Office Action dated Jan. 30, 2017 in U.S. Appl. No. 14/961,357, by Holenstein.

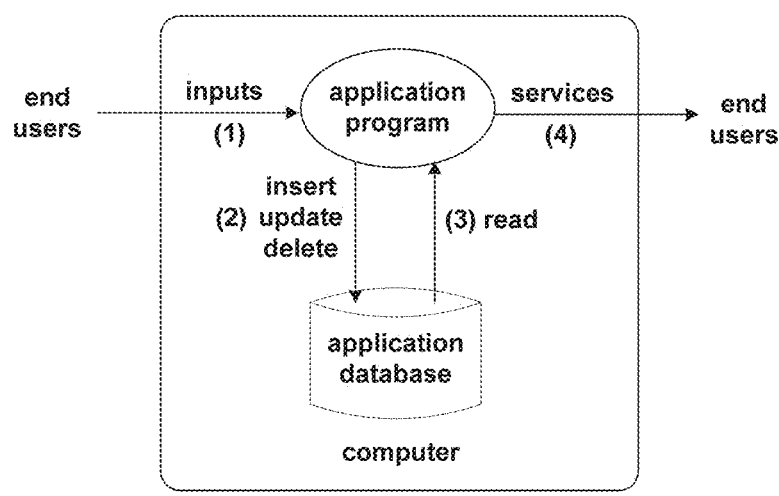
Figure 1: Prior Art - An Application

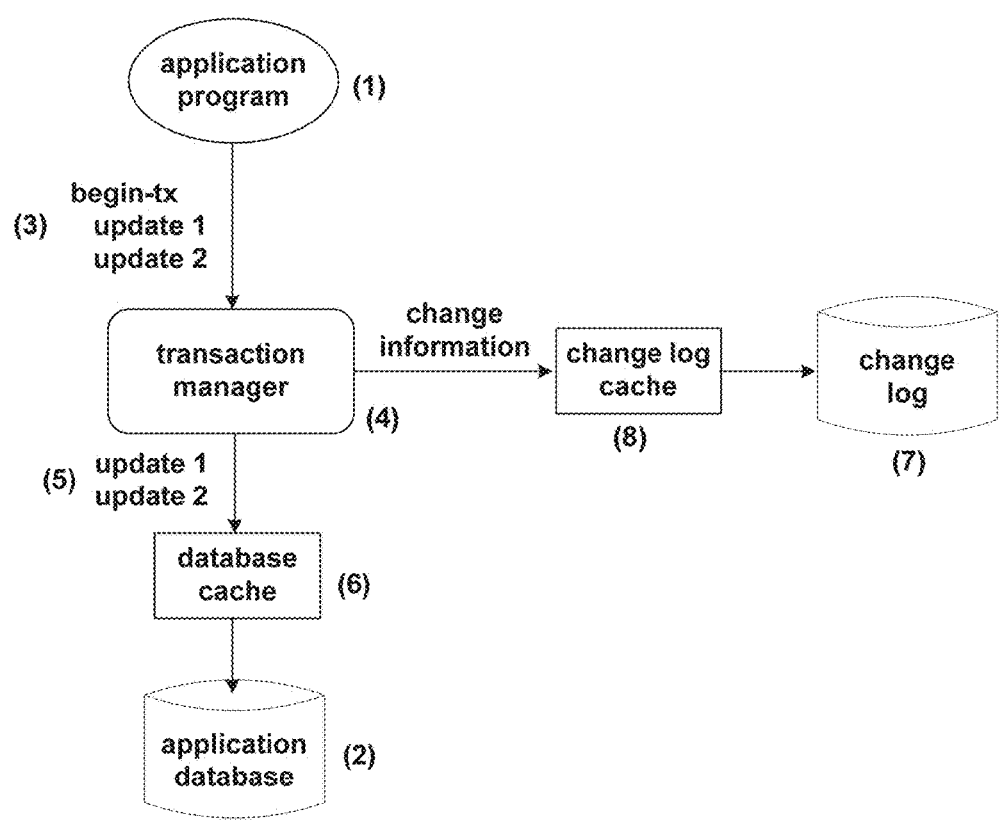
Figure 2: Prior Art - Transaction-Manager Database Updates

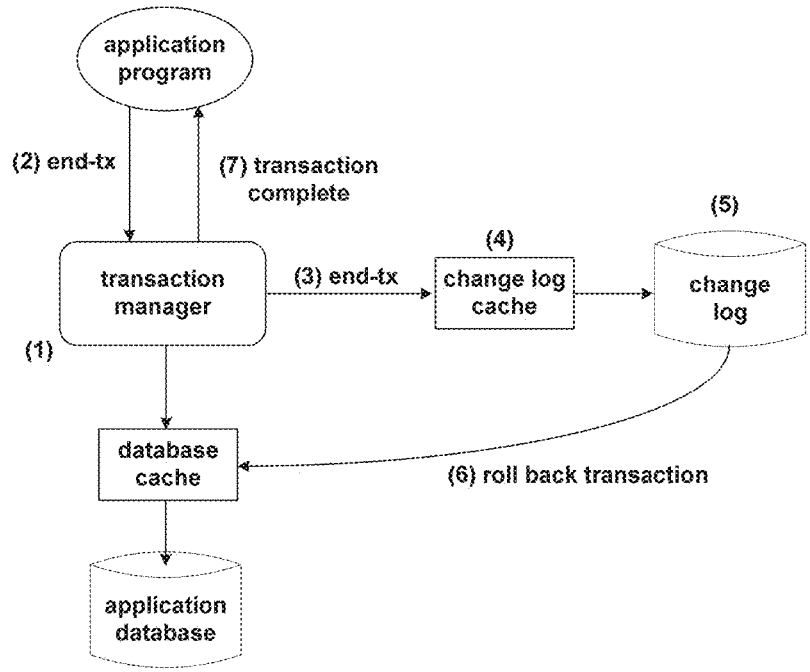
Figure 3: Prior Art - Single-System Transaction Commit
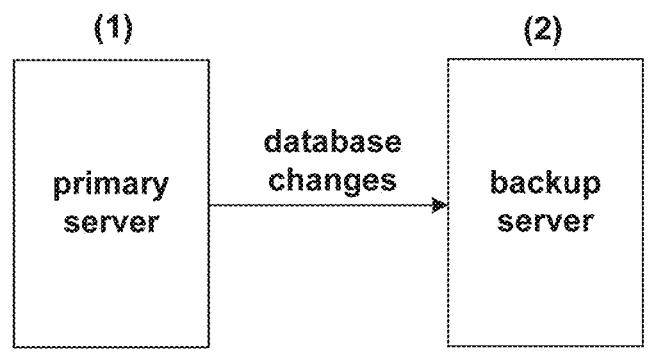
Figure 4: Prior Art - Active/Backup Configuration

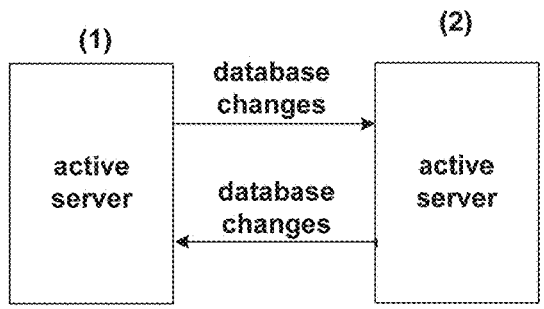
Figure 5: Prior Art - Active/Active Configuration
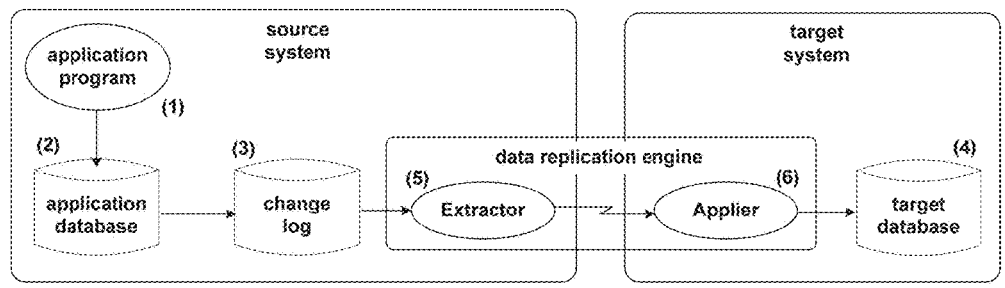
Figure 6: Prior Art - A Data Replication Engine
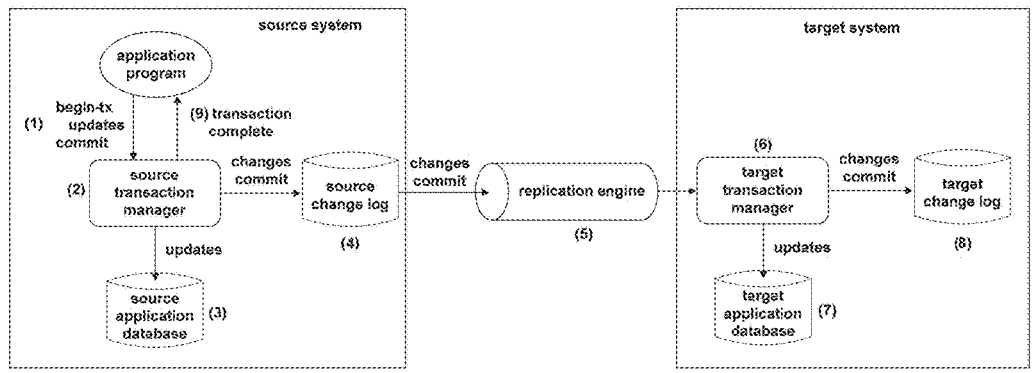
Figure 7: Prior Art - Asynchronous Replication

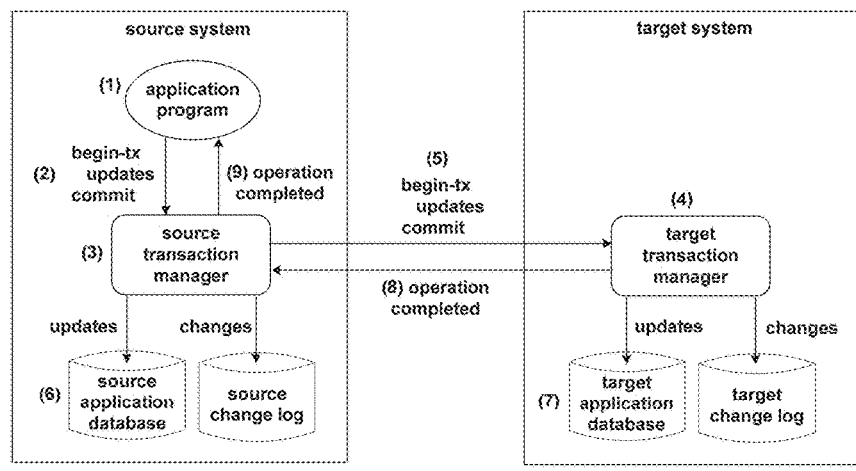
Figure 8: Prior Art - Synchronous Replication
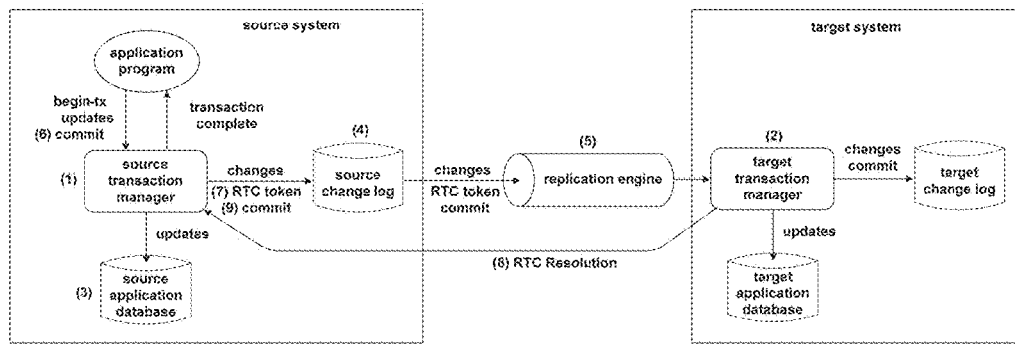
Figure 9: Prior Art - Coordinated Commits

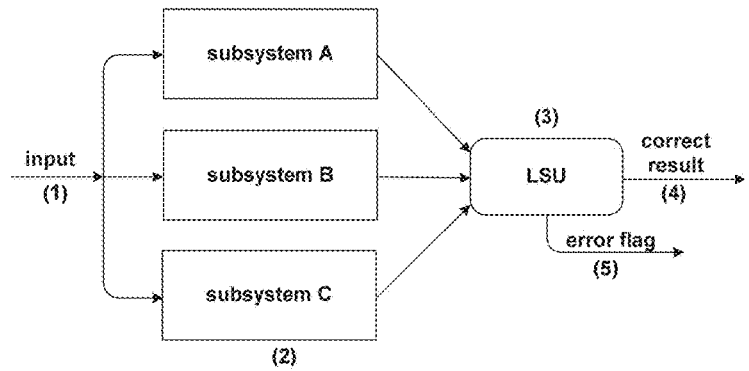
Figure 10: Prior Art - Logical Synchronization Unit (LSU)
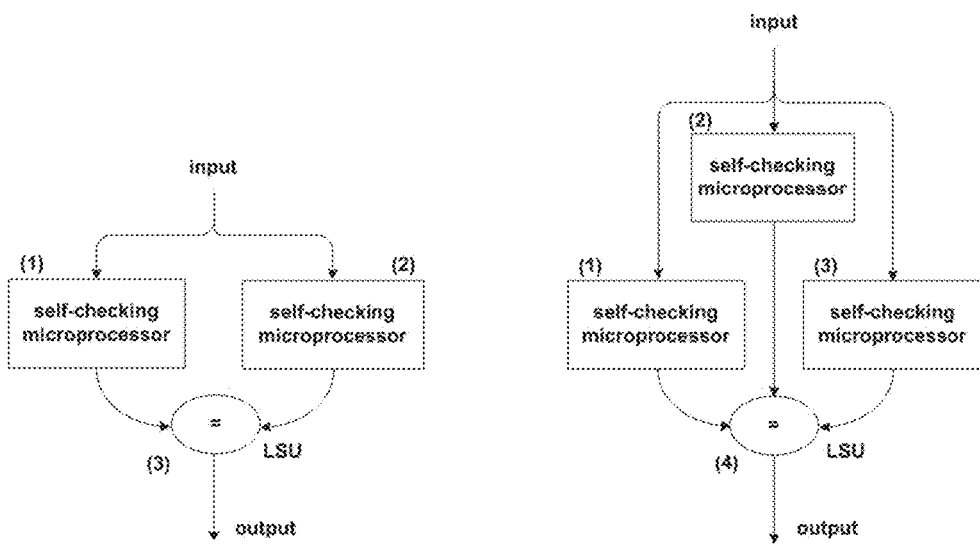
Figure 11a: Prior Art – NonStop NSAA DMR Logical Processor
Figure 11b: Prior Art – NonStop NSAA TMR Logical Processor

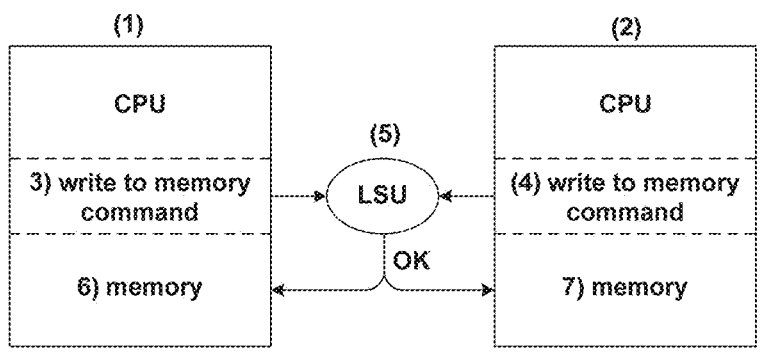
Figure 12: Prior Art - Stratus ftServer DMR Logical Processor

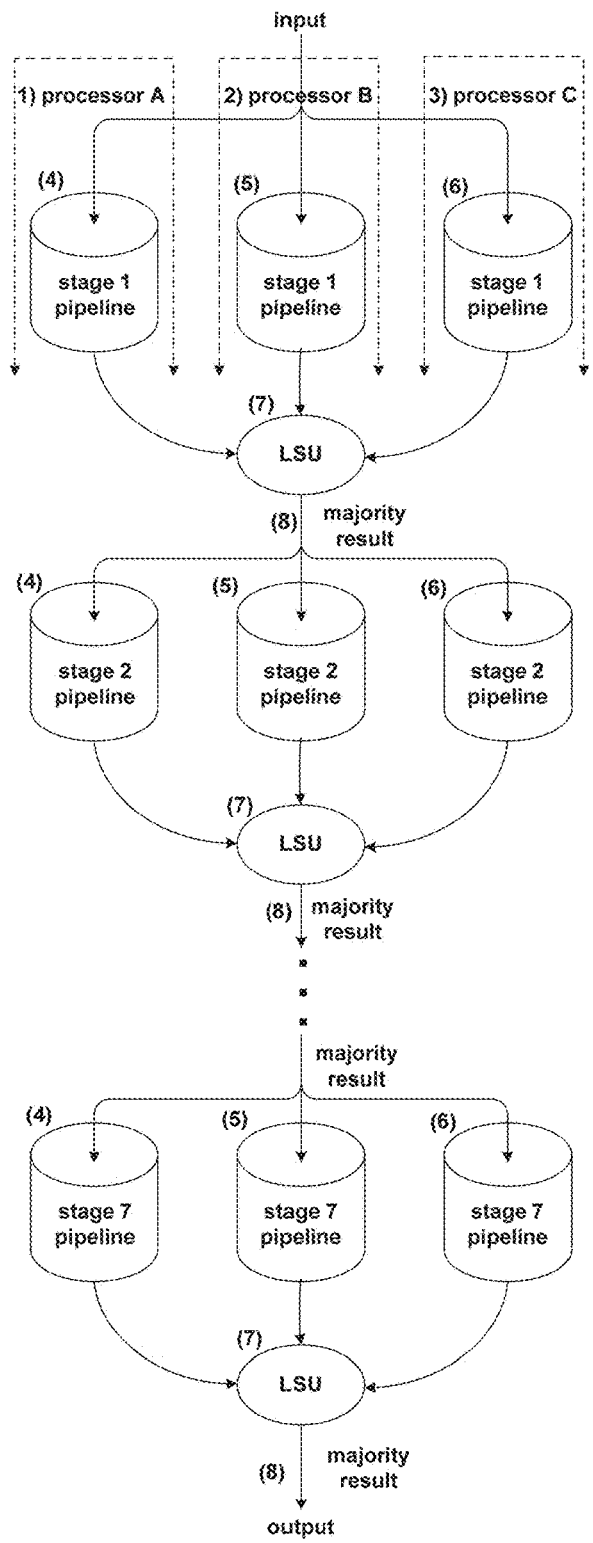
Figure 13: Prior Art - Saturn Launch Vehicle Digital Computer

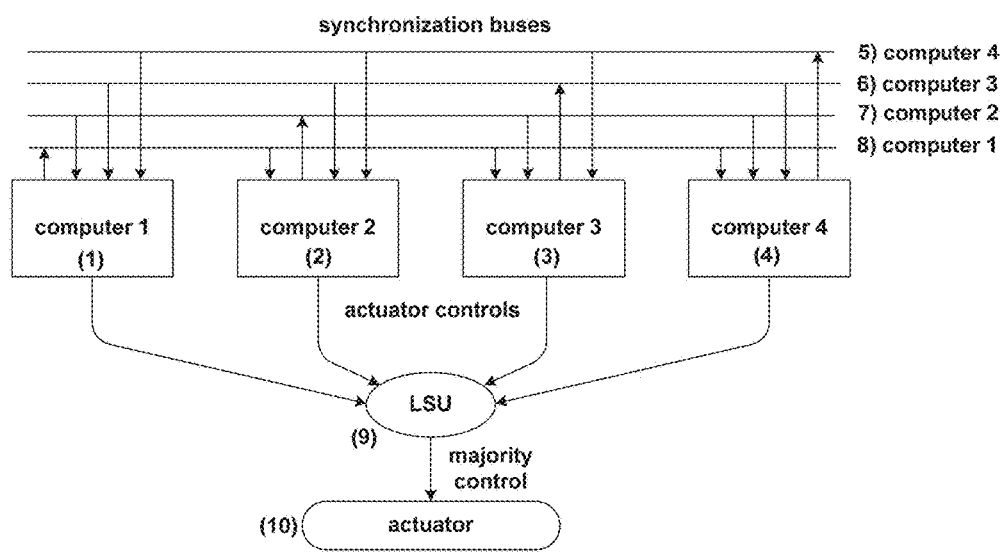
Figure 14: Prior-Art - NASA Space Shuttle

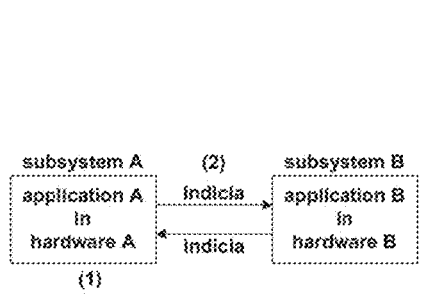
Figure 15a: Heterogeneous Indicia Engine (HIE) DMR Configuration
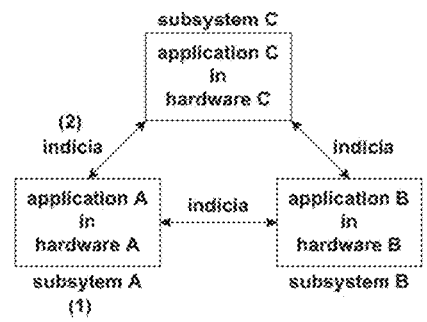
Figure 15b: Heterogeneous Indicia Engine (HIE) TMR Configuration
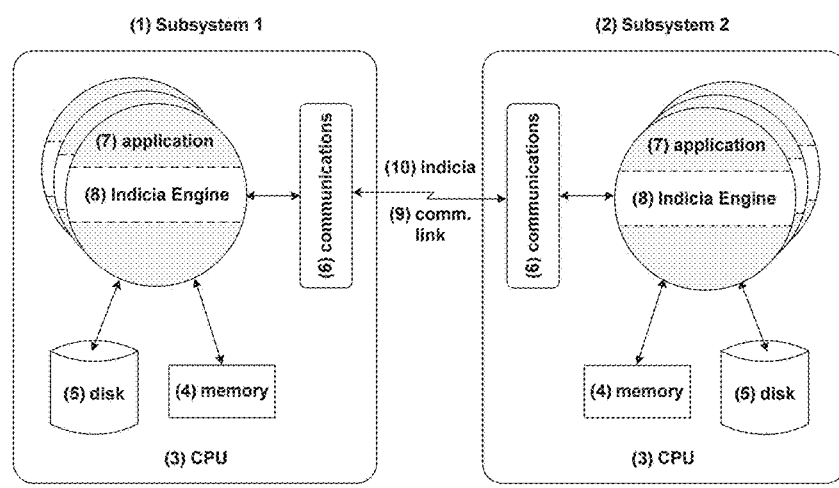
Figure 16: Indicia Engine Structure

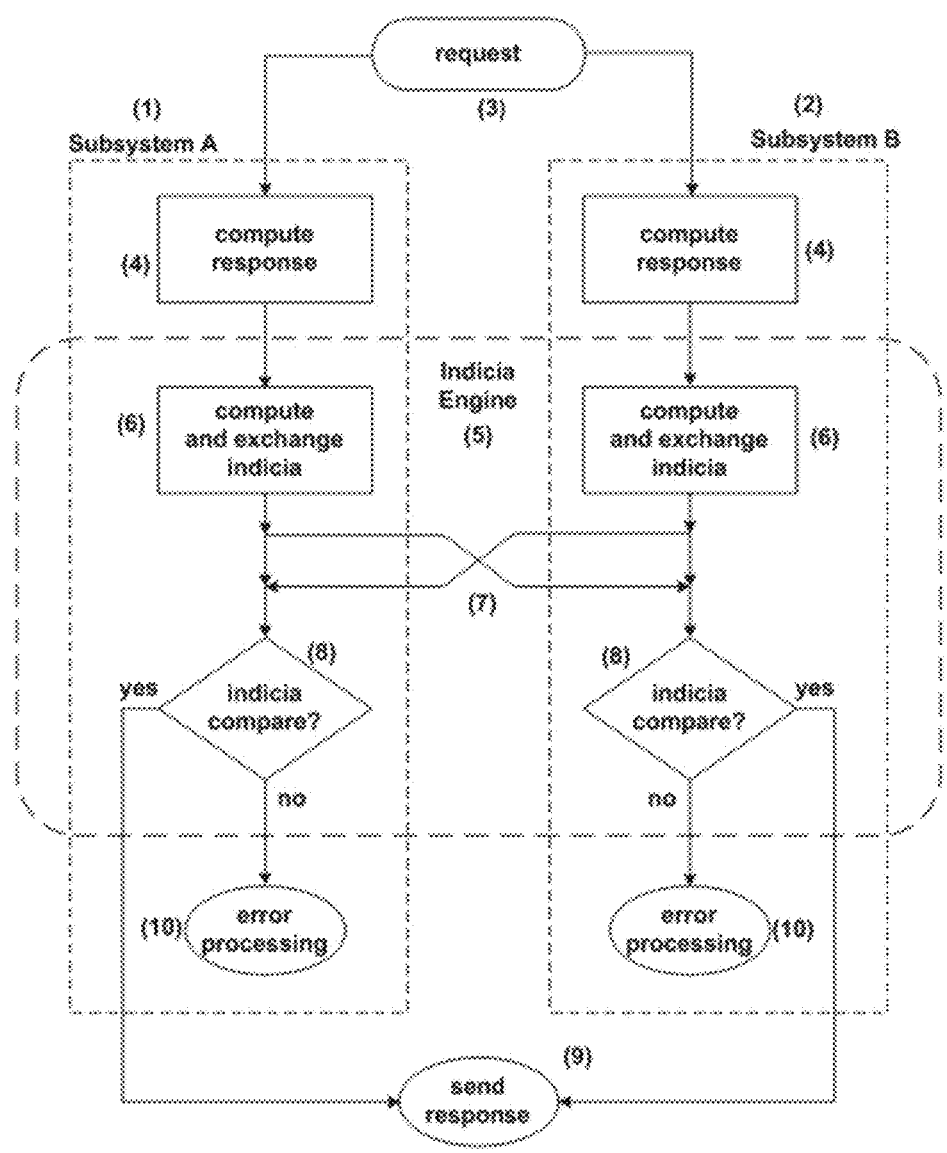
Figure 17: Heterogeneous Verification Method Flow Chart

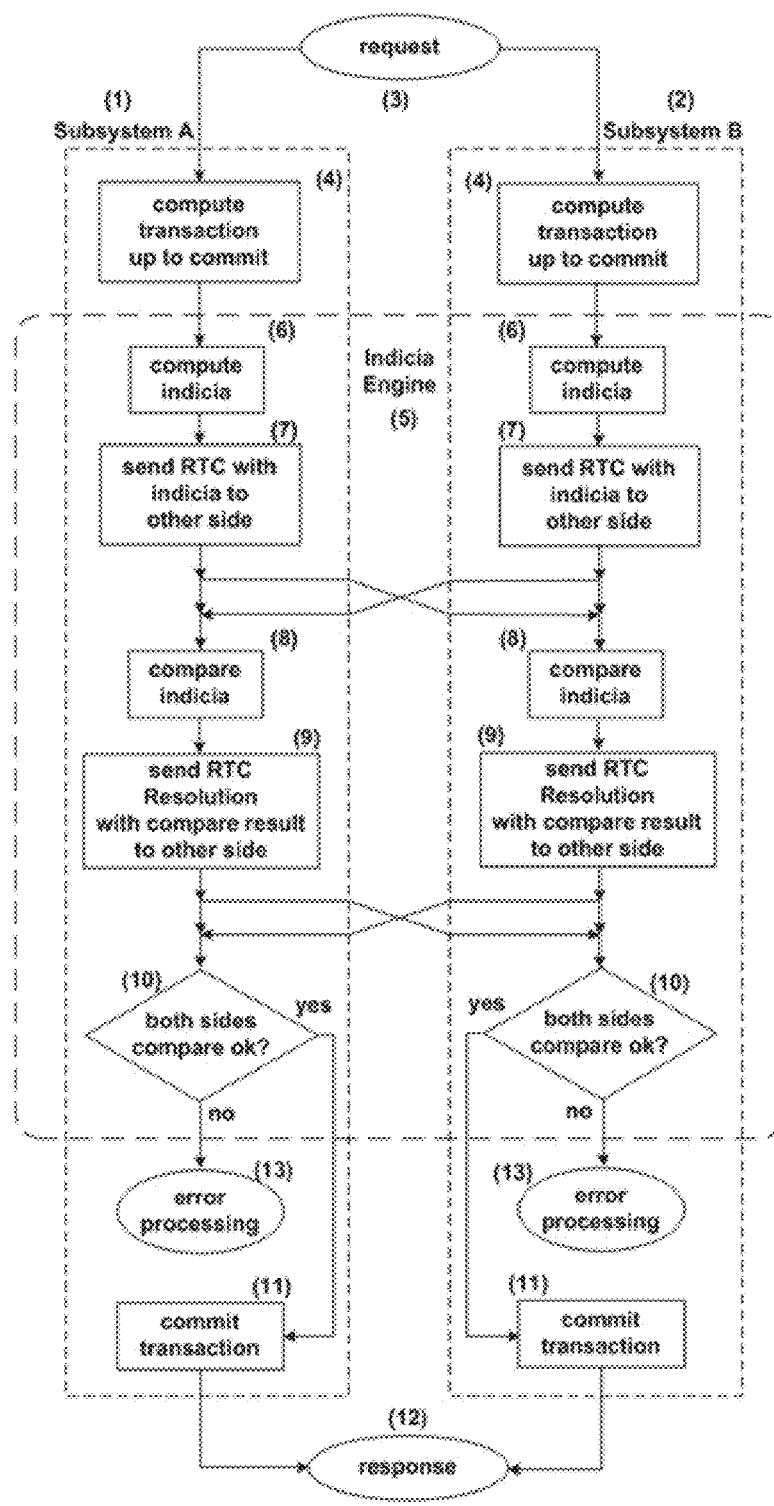
Figure 18: HIE Verify-Before-Commit Flow Chart

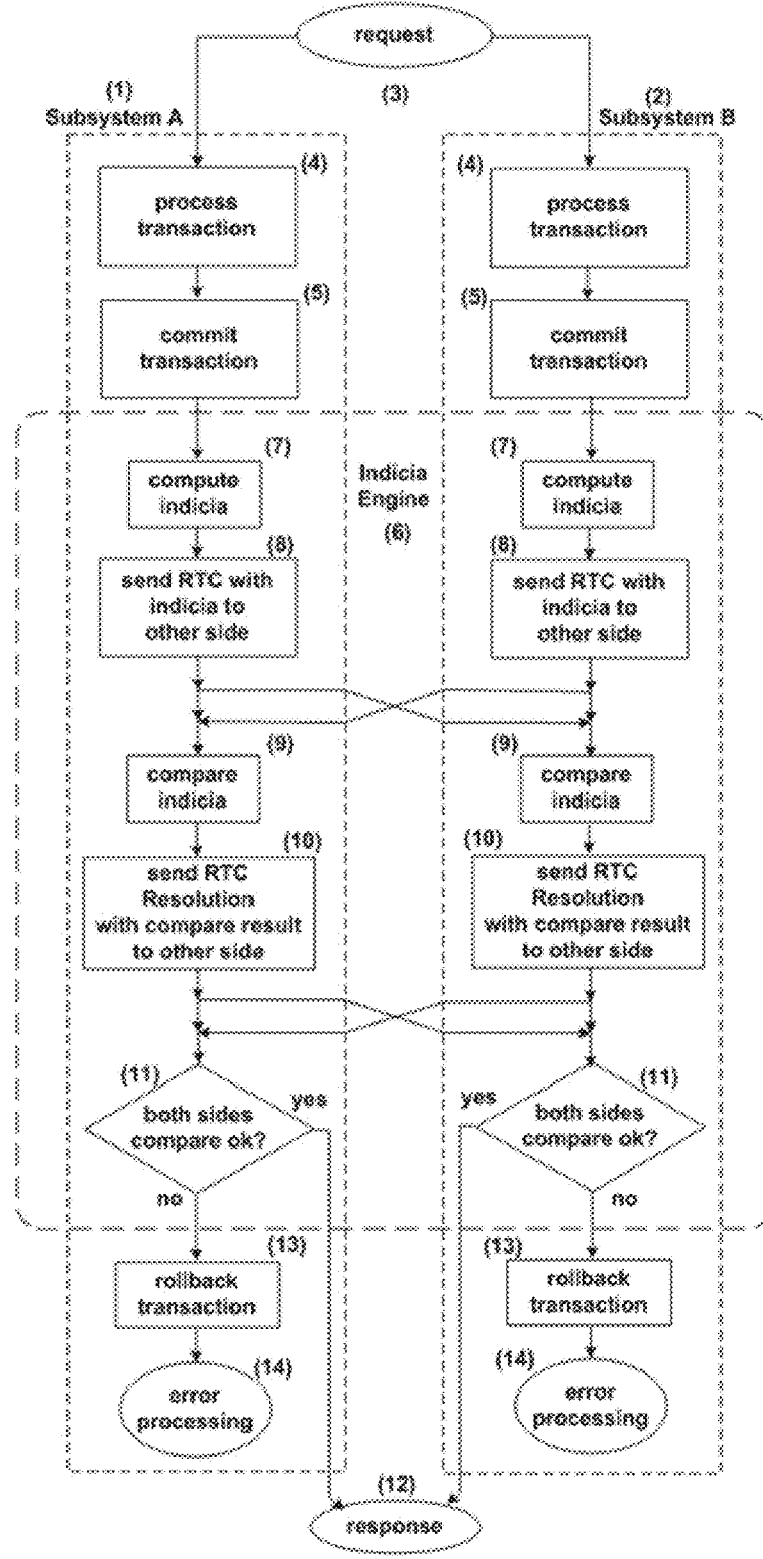
Figure 19: HIE Commit-Before-Verify Flow Chart

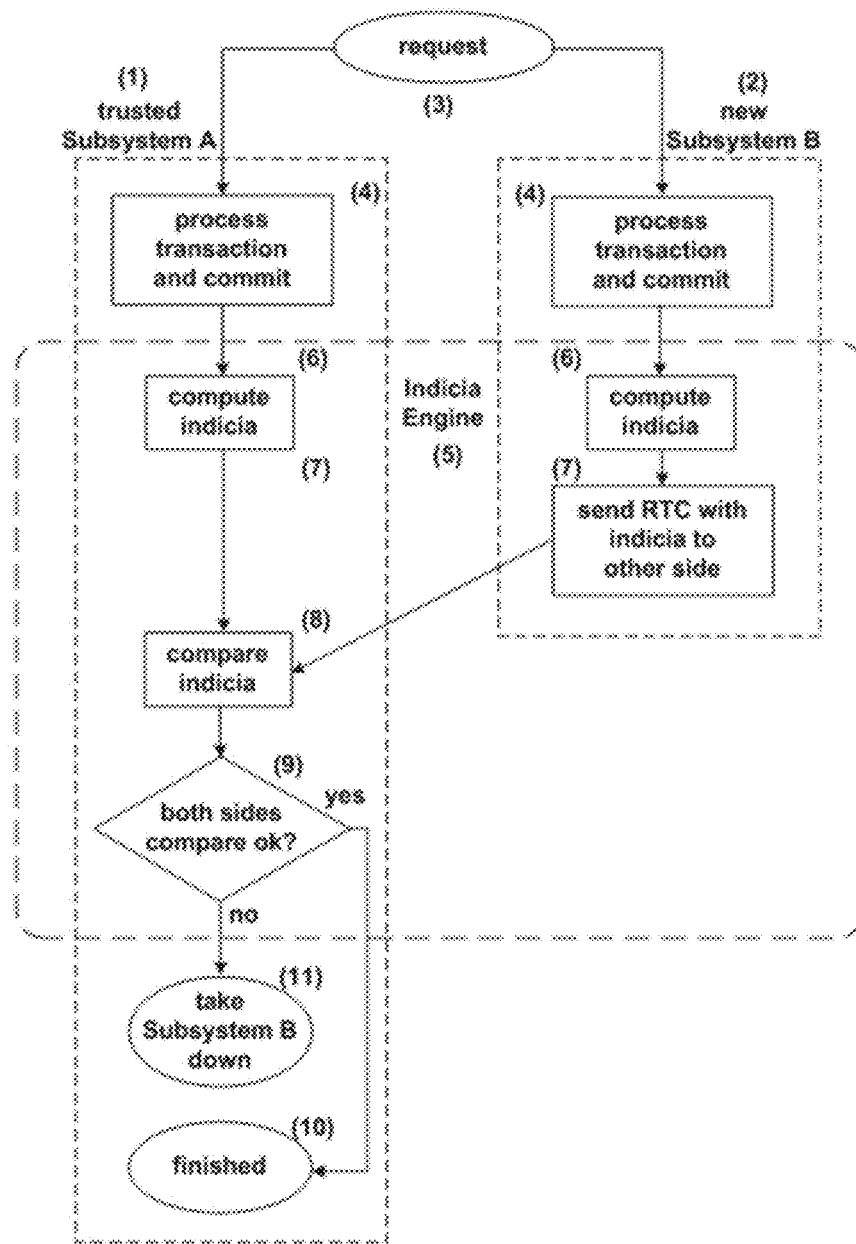
Figure 20: Certifying a New System with HIE Flow Chart

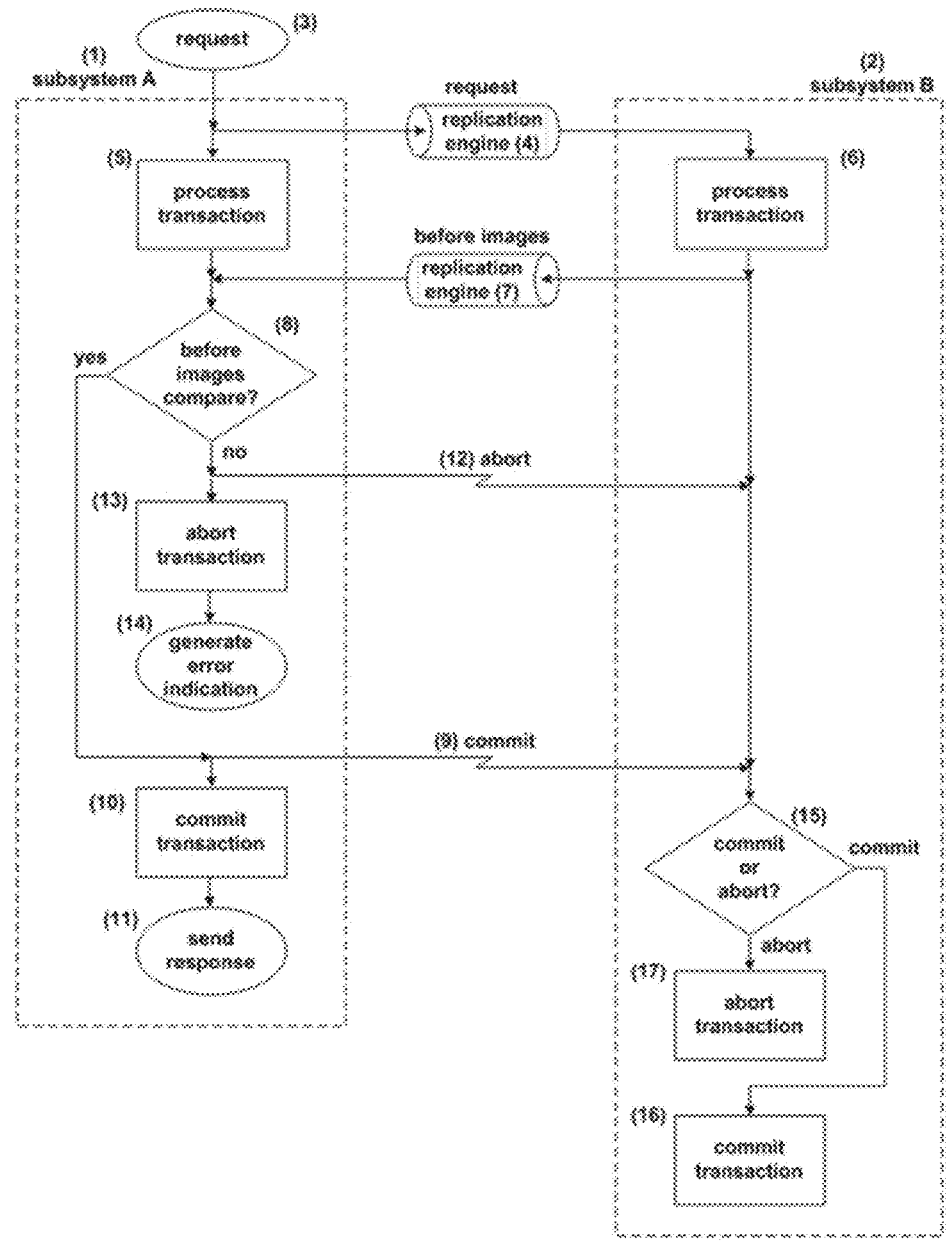
Figure 21: Alternative Embodiment for HIE

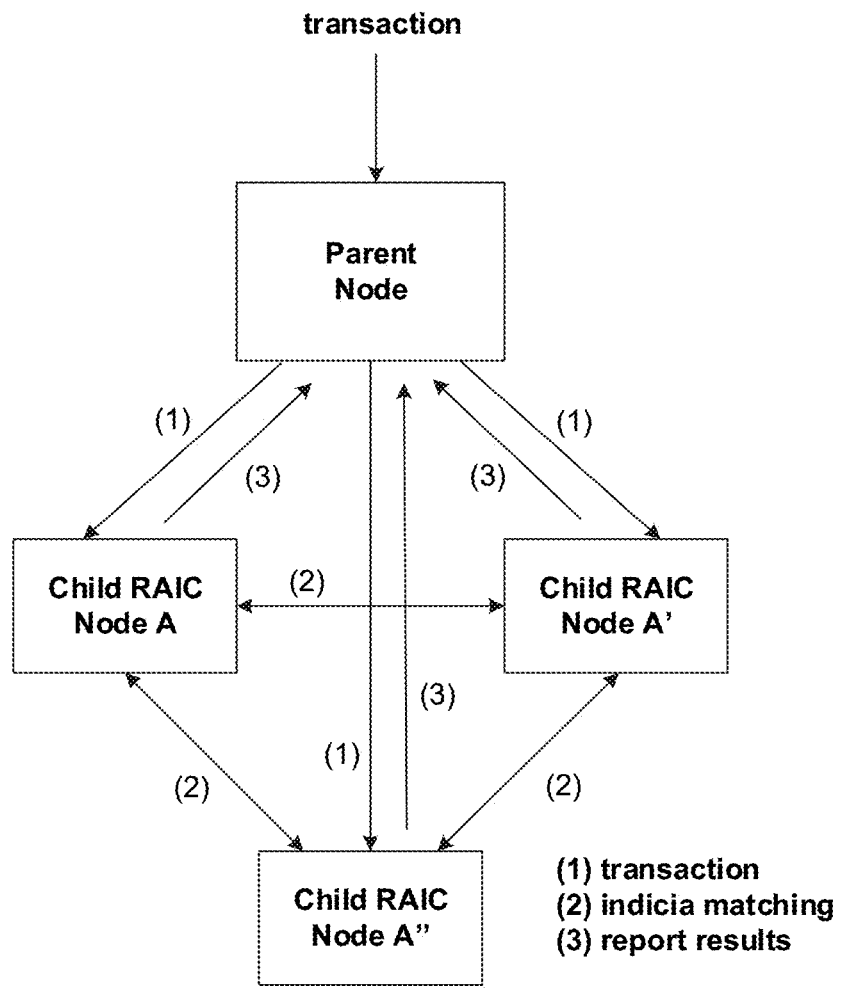
Figure 22: Redundant Array of Independent Computers (RAIC)

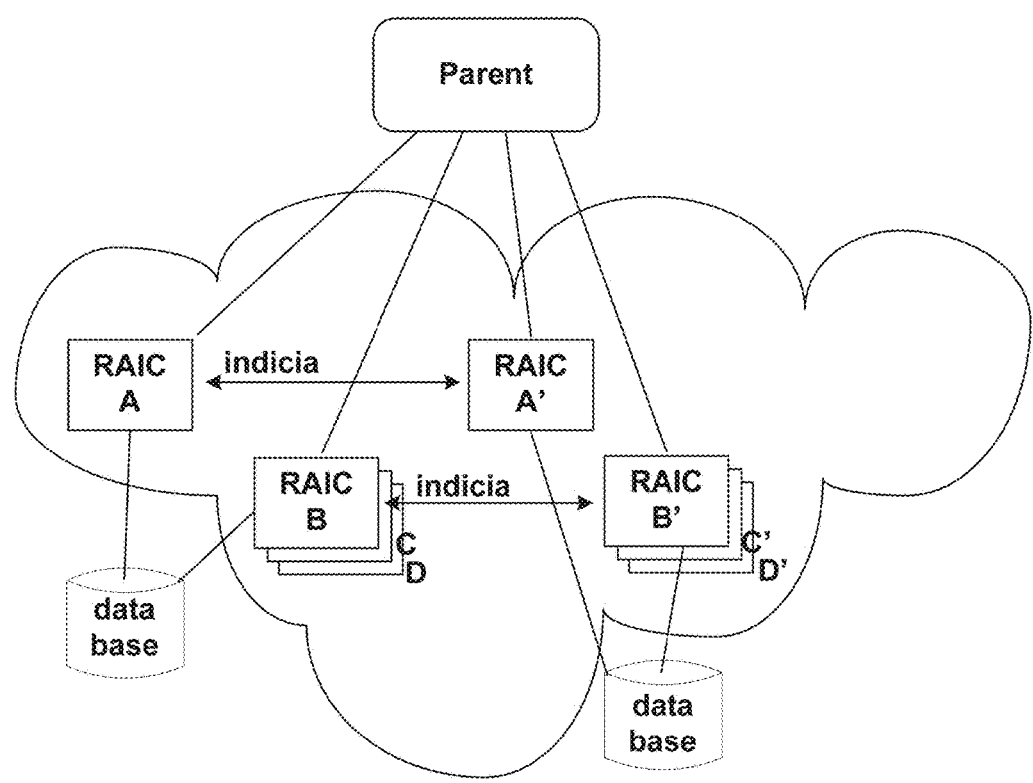
Figure 23: Bursting to a Single Cloud for Scalability

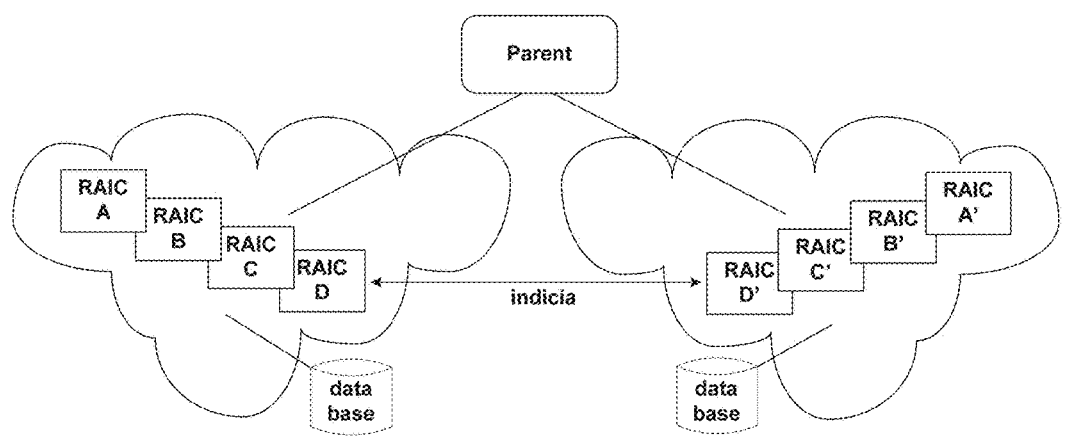
Figure 24: Bursting to Multiple Clouds for Scalability and Independence

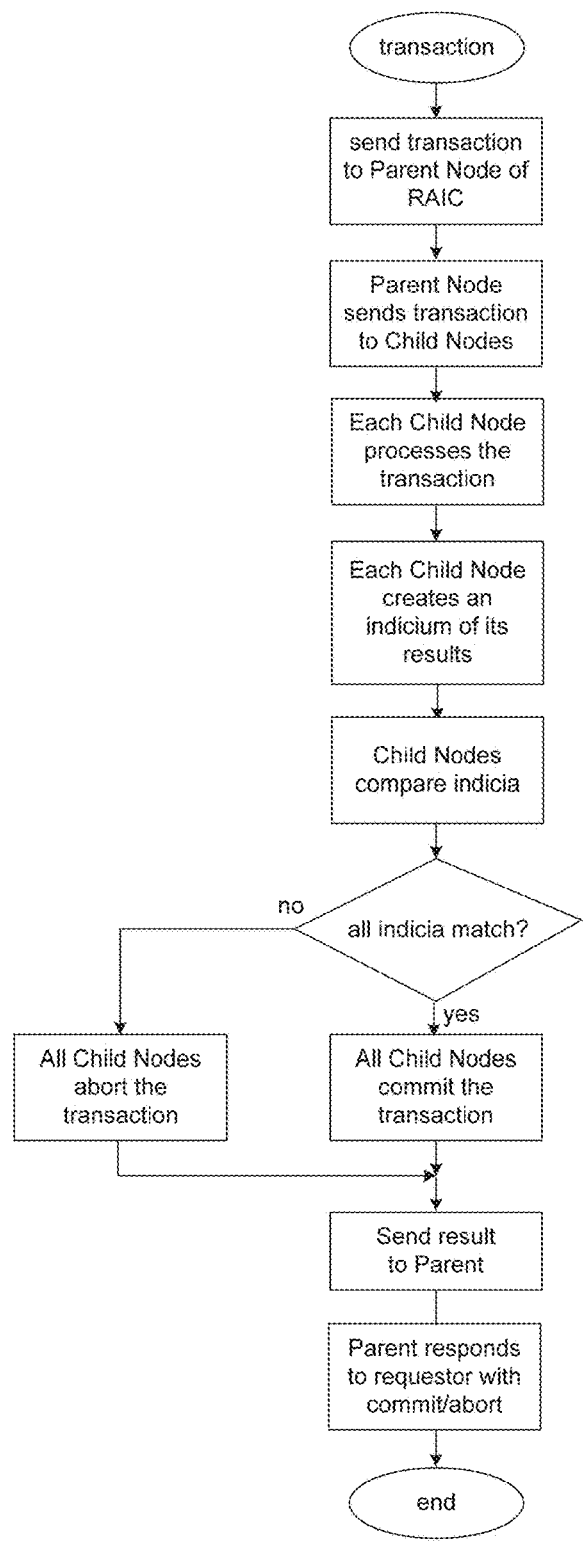
Figure 25: RAIC Flowchart – Child Nodes Check Indicia

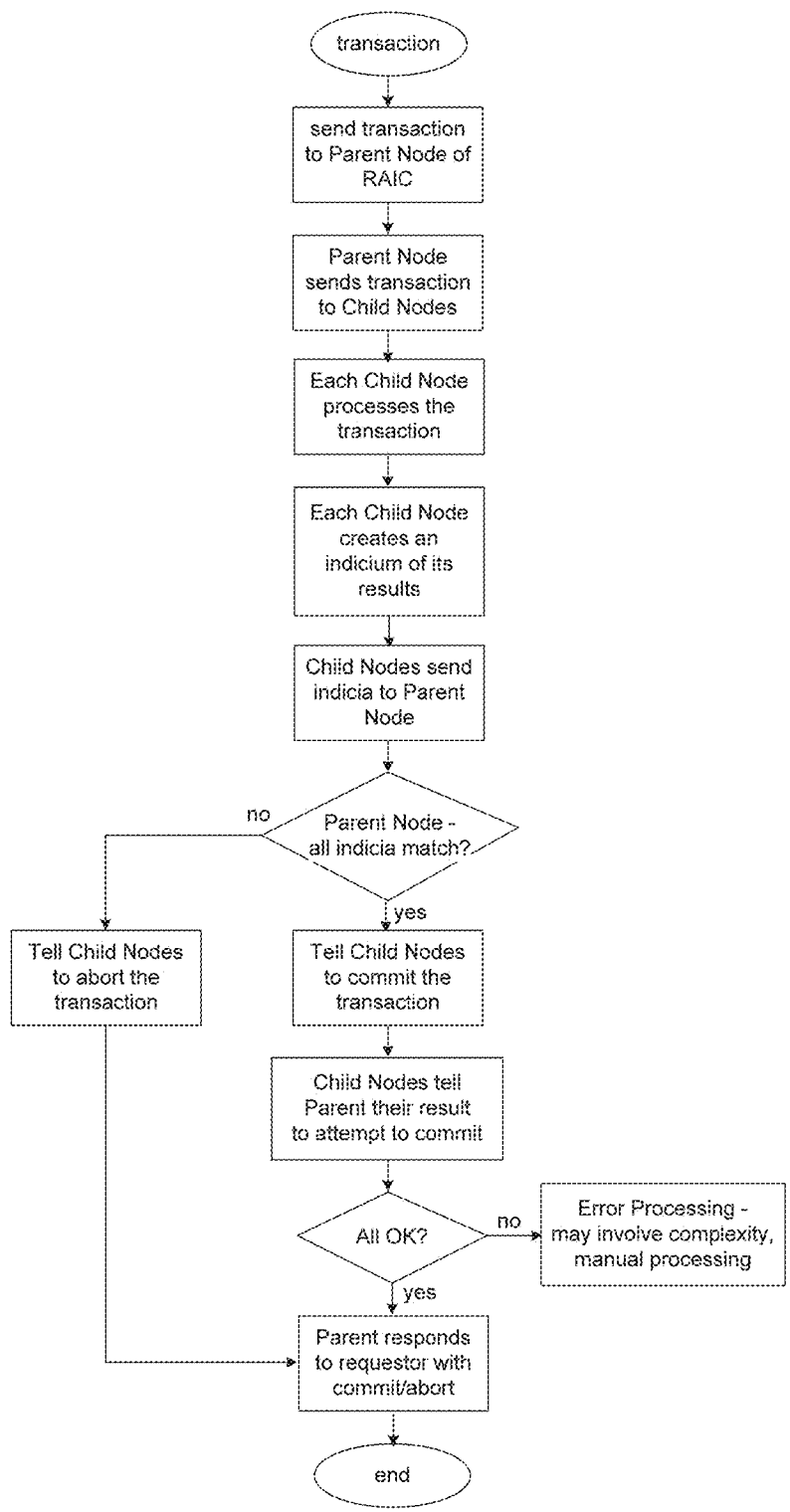
Figure 26: RAIC Flowchart – Parent Node Checks Indicia

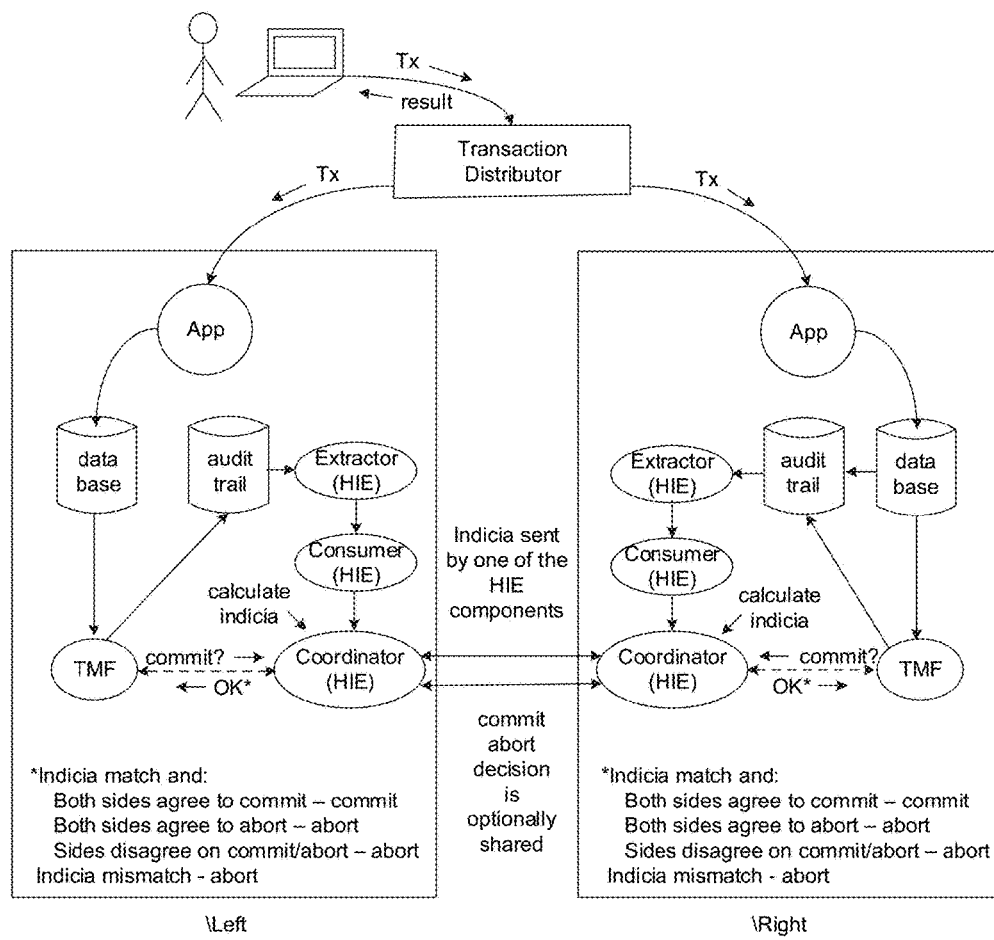
Figure 27: Internal structure of the HIE with HIE accomplishing the indicia matching

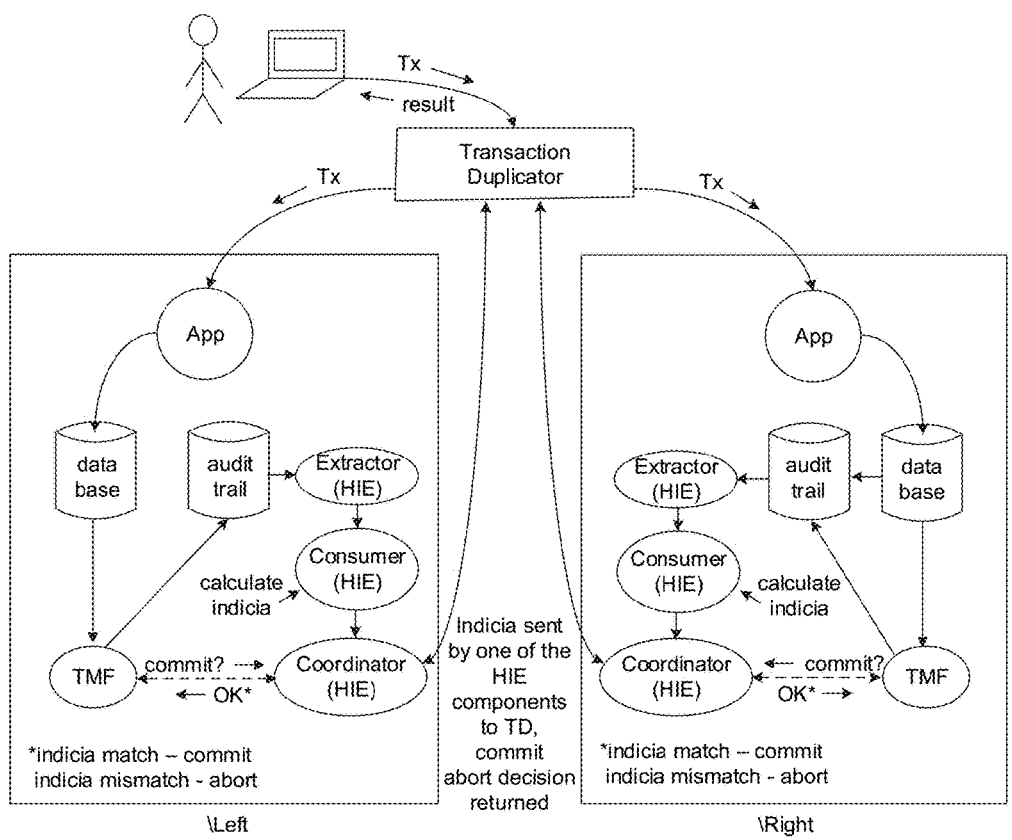
Figure 28: Internal structure of the HIE with TD accomplishing the indicia matching

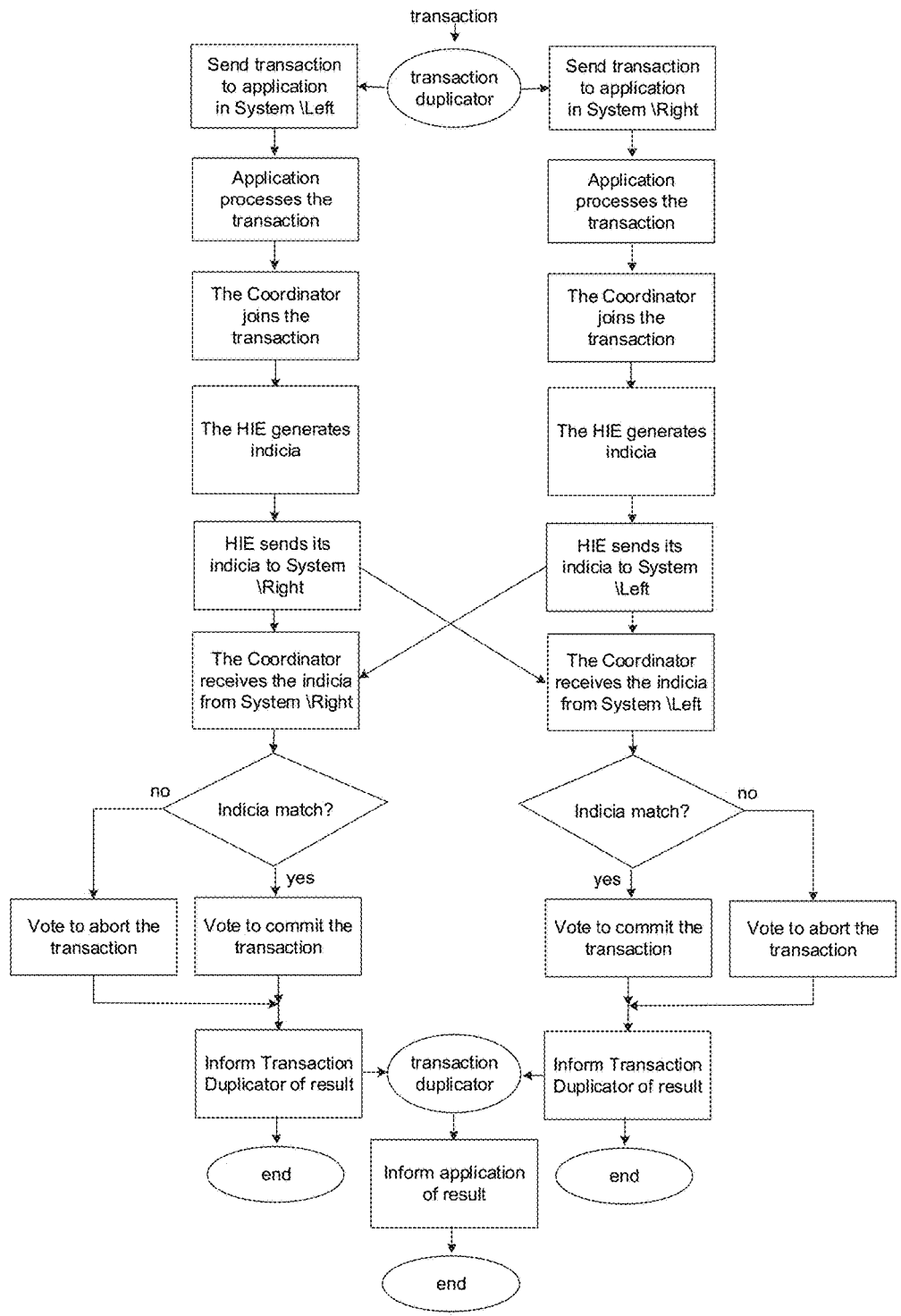
Figure 29: Flow Chart for Indicia Matching by the HIE Coordinators

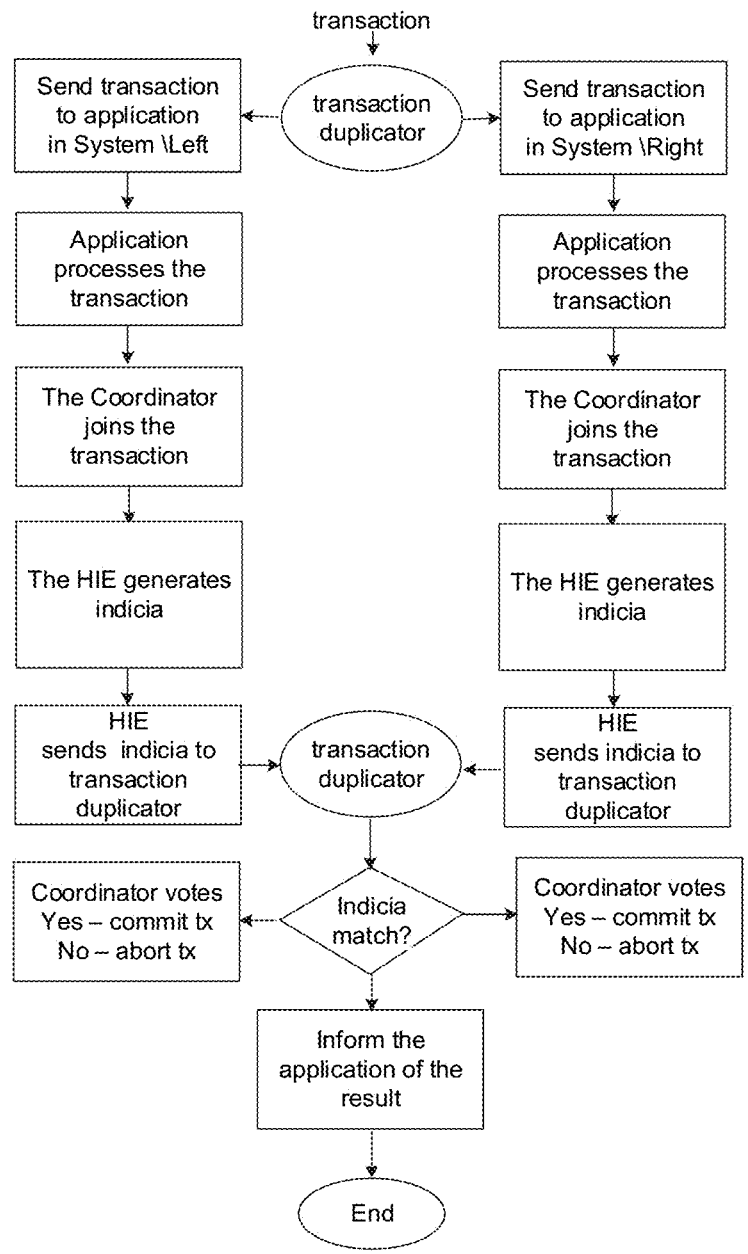
Figure 30: Flow Chart for Indicia Matching by the Transaction Duplicator

METHOD OF ENSURING TRANSACTIONAL INTEGRITY OF A SYSTEM THAT INCLUDES A FIRST SUBSYSTEM AND A SECOND SUBSYSTEM

CROSS-REFERENCE TO RELATED APPLICATIONS

This application is a continuation of copending U.S. application Ser. No. 16/026,442 filed Jul. 3, 2018, which, in turn, is a continuation of U.S. application Ser. No. 15/890,844 filed Feb. 7, 2018, now U.S. Pat. No. 10,095,730, which, in turn, is a continuation of U.S. application Ser. No. 15/701,065 filed Sep. 11, 2017, now U.S. Pat. No. 9,922,074, which, in turn, is a continuation-in-part of U.S. application Ser. No. 15/628,354 filed Jun. 20, 2017, now U.S. Pat. No. 9,760,598, which, in turn, is a continuation-in-part of U.S. application Ser. No. 14/961,357 filed Dec. 7, 2015, now U.S. Pat. No. 9,734,190. The entire disclosures of each of these applications are incorporated by reference herein.

BACKGROUND OF THE INVENTION

The present invention relates to the prevention of computational errors in computing systems due to malware, software errors, firmware errors, or hardware design errors.
1.1 Computer Applications Data-processing applications form the basis for much of our daily activity, from business to entertainment. Most applications are implemented as programs running in a computer. In many cases, an application depends upon a database of information that it maintains to record the current state of the application and user data. Typically, the information in the database is fundamental to the operation of the application, to the decisions it makes, and to its delivery of services to the end users.

The application's end users may include people, other applications, devices, and other systems. In this specification, the term "end users" means any entities such as these that can influence an application and/or can use the services that it provides.

The fundamental components of an application are shown in FIG. 1. The application comprises a database and a program that is running in a computer (hereinafter also referenced as a server). The database may be stored in persistent storage such as a disk for durability, it may be stored in high-speed memory for performance, or it may use a combination of these storage techniques. The database may be resident in the same computer as the application program, it may be resident in another computer, it may be implemented as an independent system, or it may be distributed among many systems.

A database generally includes several files or tables, though it may be just a random collection of unorganized data. Each file or table typically represents an entity set such as "employees" or "credit cards." Files are organized into sets of records; tables are organized into sets of rows, which are analogous to records. A record or a row is an instance of a specific entity in an entity set, such as an employee or a credit card. Records are further organized into fields; rows are organized into columns, which are analogous to fields. A field or column contains an attribute of the entity set, such as "salary" for employees or "credit limit" for credit cards. In this specification, "table" is to be interpreted as "table" or "file." "Row" is to be interpreted as "row" or "record." "Column" is to be interpreted as "column" or "field."

With reference to FIG. 1, the application receives inputs from certain end users (1). It processes these inputs and may make certain modifications to its database as a result (2). Database modifications are made via DML (Data Manipulation Language) and DDL (Data Definition Language) commands. DML commands modify the contents of the database. Examples of DML commands are insert a row, update a row (modify its contents), and delete a row. DDL commands typically modify the structure of the database. Examples of DDL commands include insert or delete a table and insert or delete a column in an existing table.

The application can read the contents of rows in its database (3). As part of its processing, it may read certain information from its database to make decisions. Based on the inputs it receives from its end users and the data in its database, the application delivers certain services to its end users (4). A service may be delivered as the result of a specific input from an end user, such as providing an account balance in response to an online banking query. Alternatively, a service may be delivered spontaneously by the application program, such as on a timed basis or when certain conditions occur. For instance, an alarm may be generated to operations staff if the load being carried by an electric-power transmission line exceeds a specified threshold.

The end users providing the input to the application may or may not be the same end users as those that receive its services.
1.2 Transactions
1.2.1 The Structure of a Transaction A common form of application is one that processes transactions. A transaction is a related set of DML (or in some cases DDL) commands that are bounded by a begin-transaction directive and an end-transaction directive. Alternatively, there may be no explicit begin-transaction directive. Rather, the start of a transaction can be deduced from the first occurrence of a DML (or DDL) command for a new transaction. Systems that are transaction-driven are known as online transaction processing (OLTP) systems.

Transactions guarantee the integrity of the database by ensuring that each transaction obeys the ACID properties—atomicity, consistency, isolation, and durability. Atomicity means that either all operations contained within the transaction are executed or that none are. Consistency means that at any time, the view of the database represents an accurate view of the application data. Isolation means that the processing of a transaction is unaffected by other transactions that are being processed simultaneously. Durability means that the resulting modifications to the database by a transaction will survive any subsequent system failure.

For instance, consider an online banking application. A customer wants to move $100 from his savings account to his checking account. A typical set of DML commands to accomplish this are:
   Begin transaction
     Read savings account balance
     Subtract $100
     Update savings account balance
     Read checking account balance
     Add $100
     Update checking account balance
   End transaction All of these operations must be executed, or none are. For instance, if the banking application should subtract $100 from the savings account balance but not add $100 to the checking account balance, the customer is short $100.

1.2.2 Transaction Manager

The ACID properties of a transaction are controlled by a transaction manager.

1.2.2.1 Database Updates

As shown in FIG. 2, the application (1) does not directly update the database (2). Rather, it sends the transaction operations (3) to the transaction manager (4) (or in some cases, to the file system acting on behalf of the transaction manager).

The first operation that the application sends to the transaction manager is the begin-transaction directive (unless the begin-transaction is inferred by the transaction manager from the first operation in the transaction). The transaction manager will assign a transaction ID to the transaction. The application will then send each of the database operations (3) to the transaction manager one-by-one. When it receives a database operation, the transaction manager will lock the corresponding data item in the database and will apply the update (5) to the database. Changes to the database either may be made to data-item images stored in the disk's high-speed cache memory (6), or they may be written directly to persistent storage such as disk (2). If changes are made to data-item images in cache memory, the server's operating system will periodically write a batch of changes stored in cache to persistent memory in order to make room for new changes.

In addition, the transaction manager will write a description of each change into its change log (7). A change log record typically includes the transaction ID and the before and/or after images of the data item being modified (the before image of an insert is null as is the after image of a delete). The change log information may be written either to a change-log cache in memory (8), or each change may be written directly to a change log in persistent storage, such as a disk (7).

1.2.2.2 Transaction Commit/Abort

With respect to FIG. 3, when the transaction manager (1) receives the end-transaction directive (2), it will decide whether to make the transaction permanent (commit transaction) or to roll back or undo the transaction (abort transaction).

If the transaction manager decides to commit the transaction, it writes an end-transaction token (3) into the change log. If the change log uses cache storage in high-speed memory (4), the change log is flushed from its cache to persistent memory (such as a rotating disk or to solid-state memory) (5). The transaction is now durable as it can be reconstructed from the change information in the persistent change log.

The transaction manager will decide to abort the transaction under any number of circumstances. For instance, if there were a database error that prevented one of the transaction operations to complete, the transaction manager will abort the transaction. Likewise, if the application failed before the transaction manager received the end-transaction directive, the transaction manager will abort the transaction. Alternatively, instead of sending the end-transaction, the application can send an abort directive to the transaction manager requesting that it abort the transaction. To abort a transaction, the transaction manager inserts an abort token into the change log (4) (5) and uses the before images in the change log to roll back the database to its state before the processing of the transaction began (6).

When the transaction manager has completed the commit or abort of the transaction, it releases the locks that it is holding on the modified data items. It then notifies the application that it has either committed or aborted the transaction (7). The processing of the transaction is now complete.

1.2.2.3 Maintaining the ACID Properties

Consequently, the transaction's operations contained within the begin-transaction/end-transaction boundaries will either all be applied to the database (the transaction is committed) or none will be applied to the database (the transaction is aborted). This is the atomicity property of ACID.

The ACID properties of consistency and isolation are achieved by the locking of each data item in the database that is to be updated by the transaction manager. Thus, while the transaction is open, no other application can read that data item. An application can only read data that is not currently being updated, thus guaranteeing consistency. Likewise, an application cannot update data items that are being updated by another transaction. It must wait until that transaction completes and the locks on the data items are released. This guarantees isolation.

Finally, the transaction is durable since all changes have been recorded in persistent storage in the change log. If the system should fail, the change information survives. When the system is restored to service, any transactions that were lost are recovered from the change log. The change log can also be used to roll back partial transactions that had not been completed or to restore data that had been lost due to operator or other error.

1.2.2.4 Other Advantages of a Transaction Manager

The change log provides other advantages as well. It serves as a queue of database changes that can be followed to replicate database changes to another system to keep the two databases synchronized. For instance, in an active/backup architecture in which a backup system is provided to take over application processing should the active system fail, data replication from the change log is often used to keep the backup database synchronized with the active database. Data replication provides similar services for more advanced business continuity architectures as well, including those where the application is active on all systems.

Another advantage that is achieved by many transaction managers is an improvement in performance. Since database changes are recorded in a persistent change log, it is not necessary to write the actual database changes to the database before the transaction is committed. The database changes remain in high-speed cache memory where they are available to be rapidly accessed by the applications. Database changes may be batched and written to the database at the convenience of the operating system. Since writing sequential blocks to the change log is much faster than updating data items distributed randomly across the database, transaction response time is improved.

1.2.3 Synchronizing Multiple Databases

For a single system, commit processing is discussed in Section 1.2.2.2, "Transaction Commit/Abort." In summary, when the transaction manager receives the end-transaction directive for a transaction it is processing, it typically instructs that all change data that has been accumulating for that transaction in cache memory be flushed to the change log, and then it writes an end-transaction token into the change log for that transaction. When the transaction's changes have been safe-stored in persistent storage, the application will typically be notified that its transaction has been committed.

If the transaction manager must abort a transaction in progress, it typically uses the before images for that transaction as stored in the change log to roll back any changes that had been made to the database on behalf of the transaction.

1.2.3.1 Redundant Servers

To achieve high availability, many transaction processing systems include a redundant server that can take over processing should the primary server fail. In an active/backup configuration (FIG. 4), the redundant server (2) acts as a backup to the primary server (1). Though the backup server may be doing other work, it is not processing transactions for the applications that it is backing up. All transaction processing is performed by the primary server. Should the primary server fail, all further transactions are routed to the backup server for processing.

In an active/active configuration (FIG. 5), both servers are actively processing transactions. A transaction can be sent to either server and will be processed the same way. Should one server in an active/active configuration fail (1), all transactions are routed to the surviving server (2). In practice, an active/active system can contain any number of server nodes.

If two or more servers are provided, it is imperative that they all have the same view of the application database. To achieve this, a data replication engine is used to replicate database changes from the primary server to the one or more other backup or active servers.

1.2.3.2 Data Replication Engines

A typical structure for a data replication engine is shown in FIG. 6. As an application (1) makes changes to its database (2), those changes are captured by the transaction manager and entered into the change log (3). The change log is used as a queue of changes to be replicated to one or more target databases (4). Resident on the server containing the source database is an Extractor software module (5) that follows the change log and transmits each change as it is entered into the change log to the server containing the target database. There, an Applier software module (6) on the target server receives the changes from the Extractor and applies the changes to the target database (4). The Extractor and Applier modules comprise the data replication engine.

When the end-transaction directive is reached in the change log, the replication engine informs the target system transaction manager to commit the transaction. There are several techniques for committing the transaction.

1.2.3.3 Asynchronous Replication

Maintaining two databases in synchronization via asynchronous replication is shown in FIG. 7. As described in the section "Database Updates", updates (1) generated by the application on the source system are sent to the source transaction manager (2). For each update, the source transaction manager updates the source application database (3) and inserts change information for that update into the source change log (4).

A data replication engine (5) reads or receives each change from the source change log and sends these changes to the transaction manager on the target system (6). When the target transaction manager sees an indication of a new transaction being replicated to it, it typically starts an independent transaction on the target database. The target transaction manager applies the changes for the transaction to the target database (7) and enters the change information into the target change log (8).

When the application issues a commit directive (1), the source transaction manager commits the transaction on the source database. It informs the application that the transaction has been committed (9), and inserts a commit token into the source change log (4). When the commit token is replicated to the target system (5), the transaction manager on the target system (6) will commit its transaction on the target system.

As described earlier in Section 1.2.2.2, "Transaction Commit/Abort", committing a transaction involves flushing the change log to disk (if it is not already disk-resident) and releasing the locks on the data items that have been changed.

Asynchronous replication occurs independently of the application. In fact, the application does not even know that replication is taking place. Thus, asynchronous replication has no effect on application performance. Asynchronous replication can be used over any distance—even thousands of miles separating the source system from the target system—with no impact on application performance. Furthermore, the source transaction and the target transaction are different independent transactions. A failure of the target system will not impact the processing of the transaction on the source system.

However, the update to the target database occurs at some time later than when the update was applied to the source database. This interval is known as "replication latency." Thus, should the source system fail, all of the changes in the replication pipeline will typically be lost. In effect, the amount of data loss is the number of transactions that were initiated in a replication-latency interval.

Another problem with asynchronous replication is "data collisions." A data collision occurs if two systems attempt to change the same data item in their copy of the database within the replication latency interval. Neither system will know that the other system has made this change. Each system will replicate its change to the other system, thus overwriting the change just made by that system. Now both systems are different and both are wrong. Data collisions can be managed automatically be policy (such as accepting the later change), they can be ignored for some applications, or they can be corrected manually.

1.2.3.4 Synchronous Replication

Synchronous replication solves the data-loss problem of asynchronous replication. With synchronous replication, a change to the source database is not completed until the target server has applied the change to its database. There are many ways that synchronous replication can be implemented. One method is described below. It is understood that there are other synchronous replication architectures, but they lead to the same general result.

In one implementation of synchronous replication (FIG. 8), the application (1) on the source system initiates a transaction request (2) to its transaction manager (3). The request notifies the source transaction manager that the single transaction will span two independent databases, one on the source system and one on the target system. The source transaction manager will notify the target transaction manager (4) that it will be included in this transaction (5).

As the application issues update requests (2), the source transaction manager will make each update to its source database (6) and will send the update request (5) to the target transaction manager. The target transaction manager will apply the update to the target database (7) and will then respond to the source transaction manager informing it that the target database update has been completed (8). At this point, the source transaction manager will inform the application that its update has been completed (9). Note that the application must wait for an update to both the source and target databases before it can proceed on to the next update.

Likewise, when the application issues a commit request (2), the source transaction manager will begin the commit processing on its database and will inform the target transaction manager to commit the transaction on its database (5). When the target transaction manager has completed its commit, it informs the source transaction manager that the commit has been done on the target system (8). The source transaction manager can now commit the transaction on the source database. Only when the transaction has been committed on both the source system and on the target system is the application informed that its transaction has completed (9).

With synchronous replication, there is no data loss because an update is not completed until it has been applied to both databases. Furthermore, a commit is not completed until the transaction has been committed on both systems. If the source system should fail, it is known that all completed transactions have been applied to both the source and target databases. If the target system should fail during the processing of a transaction, the source transaction manager will abort the transaction.

Furthermore, data collisions are eliminated with synchronous replication because a data object will be locked on both systems before it is changed. However, this can lead to deadlocks between two systems if a separate request sent to each resulting in a separate transaction on each locks data items in the same or a different order. Each system may have to wait for the lock imposed by the other system to be released. Techniques to resolve deadlocks are well known in the prior art. One technique is for both systems to release their locks and to try again at slightly different times.

However, synchronous replication has a direct impact on application performance. For each database update made by the application, the application must wait until the update has made its way to the target system before it is notified that the update has completed. Likewise, the source system must wait for its commit to be applied to both databases. This delay is known as "application latency." Application latency is directly affected by the distance separating the source system and the target system. Typically, synchronous replication is limited to campus or metropolitan networks where the inter-system distances are measured as tens of kilometers.

1.2.3.5 Coordinated Commits

A replication technique called "coordinate commits" solves the problem of data loss and data collisions caused by replication latency suffered by asynchronous replication, and the problem of application performance degradation due to application latency suffered by synchronous replication (see U.S. Pat. No. 7,177,866 (Holenstein et al.). With coordinated commits, all database updates are replicated via asynchronous replication, thus not affecting application performance. It is only at commit time that the application is paused to "coordinate the commits." The source system waits until the target system acknowledges that it can commit the transaction. At that point, the transaction is committed on both systems and the application is notified that the processing of the transaction has been completed. If either system cannot commit the transaction, the transaction is aborted on both systems.

FIG. 9 shows an asynchronous replication system modified to implement coordinated commits. The use of this system for asynchronous replication is described in the section "Asynchronous Replication." As with asynchronous replication, when a transaction to be replicated is started by the transaction manager on the source system (1), a begin-transaction token replicated to the target system transaction manager (2) instructs it to begin an independent transaction on the target database. In some cases, the begin token is implicit with the first I/O even contained in the transaction. Database updates are then made to the source database (3) and are passed to the target transaction manager via the change log (4) and the replication engine (5) for updating the target database.

When the application issues a commit command (6), this command is held by the source transaction manager while it enters a Ready to Commit (RTC) token (7) into the change log. The RTC token is replicated to the target system. The target system is guaranteed to receive the RTC token after all of the transaction updates since the RTC token follows the updates in the replication pipeline. If the target system is prepared to commit the transaction (that is, it has safe-stored all of the database changes in persistent storage or applied them into the target database), it responds with an RTC Resolution message (8) indicating that it has received and/or can commit the transaction. At this point, the source transaction manager will proceed with its commit processing. This includes inserting a commit token (9) into the change log, which is replicated to the target system to notify it to commit the transaction.

If the target system cannot commit the transaction, the RTC Resolution that it returns will indicate that it must abort the transaction. The source system will abort the transaction and insert an abort token into the change log. When the target system receives the abort token, it will abort its transaction if it has not done so already.

If the source system cannot commit the transaction, or if the application directs that the transaction should be aborted, the source transaction manager will abort the transaction on the source database and insert an abort token into the change log. When the target system receives the abort token, it will abort its corresponding transaction.

Note that the source system does not have to wait for the target system to commit the transaction. It only has to wait for the RTC Resolution message. Short of a system failure, it is known that the target system can complete the transaction because it has safe-stored or applied all of the database updates. Thus, unlike synchronous replication, the application does not have to wait for each update to complete nor for the commit to complete across both systems. It only has to wait for the RTC Resolution message from the target system in response to its RTC token. Therefore, there is minimal impact on application performance, and application latency has been minimized.

Furthermore, with coordinated commits, there is no data loss because a transaction is committed on the source system only if it is known that it will commit successfully on the target system. Also, data collisions in a bidirectional replication configuration are eliminated because a potential data collision will result in the applications deadlocking at commit time. Either or both applications must back off and try again at slightly different times.

With coordinated commits, the advantages of synchronous replication can be achieved between source and target systems separated by thousands of miles.

1.3 Application Faults

An application fault occurs when the outputs of an application, whether they be information or services, are not what was intended by the application designers or are not reflective of the true state of the data. There are many causes of application faults:

i. Hardware faults are caused by the underlying hardware environment in which the application is operating. Hardware faults may be caused by improperly designed hardware, a failure of a hardware component, or a purposefully intended malfunction designed into the hardware. Hardware faults may also be transient faults that are not permanent. For instance, it has been shown that cosmic rays may cause a hardware logical element to behave erroneously.

ii. Software faults are caused by the software that implements the application. A software fault may be the result of improper design. This was the case when Amazon sold massive amounts of retailers' inventory for a penny per piece ("Amazon Christmas Present—Buy for a Pence," *Availability Digest*; January 2015). Transient faults may be caused by race conditions. Software faults may also be caused by malicious code (malware) that has infected the software.

iii. Firmware faults are similar to software faults, except that firmware is a type of software that is resident in persistent memory. Firmware faults may be the result of improper design. Firmware faults are not generally caused by hackers infecting it. Rather, the firmware may have been modified for malicious purposes. There have been cases in which attackers have intercepted shipments of devices being delivered to targets of interest and installed their own surveillance malware into the firmware of the devices ("Photos of an NSA "upgrade" factory show Cisco router getting implant," *ARS Technica; May* 14, 2014.)

iv. Malware is a technique that an attacker uses to achieve results not intended by the application. Typically, malware is software that infects an application's software. However, malware can be injected into the hardware or firmware of a system by the manufacturers of the system (see the sections "Sony" and "Lenovo Superfish").

Malware infections in hardware can typically be eliminated by having the different layers of a hardware chip be manufactured by different trusted companies. If a malicious designer can only see a portion of the chip layers, it is not possible for him to add a few transistors to perform a malicious task.

Software and firmware errors and security vulnerabilities built into the software or firmware can be controlled by N-version programming (NVP) (see "N-version programming," Wikipedia). With NVP, separate and independent software groups are used to program the same system from a common functional specification. The separate programs are deployed into the field on different hardware systems that have been designed from a common specification by different hardware groups. By comparing the outputs of two systems implemented from a common functional specification, anomalies in the hardware, firmware, or software of a system can be detected.

In addition to being installed during the manufacturing process, malware can infect the software controlling a computational device once it has been deployed in the field. Such an infection typically begins with the installation of a Trojan (see the section see the section "Types of Malware"). A Trojan often infects a system when an attacker is successful in luring an unsuspecting user to open a bogus email or attachment that carries the infection or to go to a malicious website that installs the Trojan (a process called phishing). The Trojan opens a "backdoor" to the system that the attacker can use to install malware of his choice on the user's system. The malware could be a form of spyware, which monitors the user's actions (keystroke logging, for instance) or harvests the system's database for information and sends this information to the attacker. Alternatively, the malware could integrate itself into the device's software and cause the device to take actions that were not intended (see the section "Stuxnet").

1.4 Malware

Malware, short for "malicious software," is any software used to disrupt computer operations, to gather sensitive information, or to gain access to computer systems (see "Malware," Wikipedia). Though in this generally accepted definition malware is malicious software, in this disclosure the term "malware" is extended in meaning to include any malicious change to a system, whether it be a change to the system's software, its firmware, or its hardware.

The injection of malware into systems is increasing at a rapid rate. From 2009 to 2013, the number of malware attacks increased five-fold (see "2014 Verizon Data Breach Investigations Report (DBIR)," *Verizon;* 2014). Malware infections often start with a phishing attack. A user is sent an email that appears to come from a legitimate source. The email asks the user to visit a particular website and provides a link to that website. If the user clicks on the link, he is taken to a website that appears in all regards to be correct. However, the website contains malicious code that is uploaded into the user's PC. Once installed, the malware in many cases can propagate to other PCs and servers that are on the infected PCs network. Alternatively, the malicious website can obtain confidential user information such as user names, passwords, and account numbers that can be used to infect other systems.

There have been cases in which a trusted manufacturer has installed malware in its hardware or software products to follow the user's browsing habits in order to obtain useful information for further sales (see the section "Sony"). Other malware infections are made via security vulnerabilities found in existing systems (see the section "Heartbleed").

A common characteristic of malware infections is that they usually are not detected by the victim. Rather, the infection is detected by some other party after a time that can be measured in weeks or months. For instance, if malware that steals payment-card information finds its way into a retailer's POS (point-of-sale) terminals, it often is an issuing bank (the bank that issued the payment cards) that detects the infection when it sees an inordinate amount of fraudulent transactions made with its cards.

1.4.1 Types of Malware

There are many types of malware that may infect a system. The types of malware include, but are not limited, to the following:

i. Trojan: A non-replicating program that acts as a backdoor allowing an attacker to have unauthorized access to the affected computer.

ii. Virus: A malware program that attaches itself to another program in the system. When executed, it replicates itself by inserting copies of itself into other computer programs or files.

iii. Worm: A standalone program that replicates itself to other computers across a network, relying on security vulnerabilities of the target computers.

iv. Spyware: Gathers information about a person or an organization without their knowledge and sends such information to another entity without the person's or organization's consent.

v. Bot: Malware typically loaded through a Trojan that allows the computer to be controlled by a botmaster. Bots comprising tens of thousands of computers are used to launch Distributed Denial of Service (DDoS) attacks on a victim website by flooding it with illicit requests.

vi. Adware: Automatically displays advertisements not wanted by the user in order to generate revenue for its author.

vii. Scareware: A virus which pranks users with the intent to cause anxiety or panic so that they will purchase a software application to correct the supposed fault.

viii. Ransomware: Restricts access to the computer system that it infects and demands that a ransom be paid in order for the restriction to be removed.

1.4.2 Types of Attackers

According to FireEye, a major provider of malware protection services, there are generally three types of cyber attackers (see "Definitive Guide to Next-Generation Threat Protection," *FireEye white paper*):

i. Cybercriminals: Individuals who attack for profit, stealing payment-card numbers and other personal data to sell on the open market.
  ii. Hacktivists: Individuals who attack for political purposes or for personal gratification via information thefts, website redirection, website defacements, or DDoS attacks.
  iii. State-sponsored threat actors: Individuals employed by a government to penetrate commercial or government computer systems in other countries to steal data or to sabotage the computer systems.

1.4.3 Examples of Malware

1.4.3.1 Zeus

Zeus is a Trojan that runs on Microsoft Windows. It opens a backdoor to the computing system that can be used by attackers to install their own malware. While it is capable of being used to carry out many malicious criminal tasks, it is most often used to steal banking information by keystroke logging and form grabbing.

1.4.3.2 Backoff

Backoff is point-of-sale (POS) malware. It infects POS terminals so that it can read the magnetic stripe data entered into the POS terminal when a payment card is swiped. It then sends this data to the attacker. The U.S. government has estimated that the POS terminals of more than 1,000 retailers have been compromised by Backoff. Of particular note are attacks against Target Stores and Home Depot. During the holiday shopping season of 2013, Target POS terminals were infected and the data from 110 million payment cards was stolen (see "Target Compromises Millions of Payment Cards," *Availability Digest*; January 2014). A similar attack was made in late 2014 against Home Depot, resulting in the theft of data from 56 million payment cards.

1.4.3.3 Sony

Spyware or other malware is sometimes found embedded in programs supplied officially by companies. The programs, downloadable from websites that appear useful or attractive, may have, for example, additional hidden tracking functionality that gathers marketing statistics. An example of such software is malware embedded into CDs sold by Sony, which silently installed and concealed itself on purchasers' computers with the intention of preventing illicit copying. It also reported on users' listening habits and unintentionally created vulnerabilities that were exploited by unrelated malware. Attackers discovered the malware and were able to use it to install their own malware on infected systems. Once discovered, Sony suspended the inclusion of this malware on its CDs.

1.4.3.4 Lenovo Superfish

Lenovo purchased the rights to IBM's manufacture and distribution of its PCs. Unbeknownst to most, Lenovo was installing the third-party Superfish adware on its PCs. It is estimated that millions of PCs around the world are infected with Superfish. Lenovo's intent in using Superfish was to inject Lenovo ads in the web search results of Lenovo owners. Unfortunately, Superfish exposed the laptops and their Internet traffic to hackers in a way that security experts have described as easily exploitable.

1.4.3.5 Heartbleed

Heartbleed is an example of a security vulnerability that was not created by an attacker but was rather a flaw in the software implementation of OpenSSL (Open Secure Sockets Layer). OpenSSL supplies security functions for Internet traffic. Heartbleed allows attackers to read memory data from clients and servers to obtain private encryption keys, passwords, user names, and account information. The software flaw was introduced in 2012 but was not discovered until 2014. It is estimated that 17% of secure websites used the flawed version of OpenSSL. The flaw in OpenSSL was a missing bounds check in the heartbeat exchanged between two systems to keep a connection alive. Attached to each heartbeat a few bytes in length, the OpenSSL server would send 64K bytes. The excess bytes came from random parts of the servers memory and could be mined for useful information. (See "Heartbleed—The Worst Vulnerability Ever," *Availability Digest*; April 2014.)

1.4.3.6 Shellshock

Like Heartbleed, Shellshock was another security flaw that was the result of a software bug. It affected the Bash command interpreter used in Linux and Unix systems, allowing trailing code in a legitimate command to be executed as part of the command. It was straightforward to add malicious code to a Bash command that would open a backdoor to welcome sophisticated malware that can infect a company's entire network. The Bash vulnerability existed for 22 years before it was detected in 2014. It is believed that certain government agencies knew about Bash over this time period but used it to gather critical information. (See "Shellshock—the Bash Vulnerability," *Availability Digest*; October 2014.)

1.4.3.7 Stuxnet

The Stuxnet worm is designed to attack and sabotage control systems used in power grids, pipelines, nuclear plants, railroads, and other facilities controlled by computers. Stuxnet focused on Iran's nuclear efforts by targeting its centrifuges. Stuxnet has two major components. One intercepts valid commands being sent to the centrifuges and replaces them with potentially dangerous commands. The other secretly records what normal operations at the facility look like and plays these back to the plant operators so that it appears to them that the plant is operating normally. Stuxnet used these invalid commands to spin Iran's centrifuges at extremely high rates, potentially destroying them. Stuxnet was spread with USB thumb drives left behind on developers' desks. Stuxnet is so complex that it is believed to have been developed by a nation state. (See "Stuxnet—The World's First Cyber Weapon, *Availability Digest*; March 2011.)

1.4.3.8 Flame

Flame is extraordinarily sophisticated spyware that appears to be used for espionage of targeted systems. Flame can log keystrokes, copy data found on the computer's disks, activate the computer's microphone and record conversations, eavesdrop on Skype calls, take screen shots, and copy itself to other computers on the network. It can also infect USB flash drives so that it can re-infect any computer into which the drive is inserted. It organizes the data it collects and communicates that data back to one of many command and control servers for further analysis via an encrypted link. It has been determined that Flame infected almost 200 Iranian computers and was targeting Iran's Oil Ministry, its oil rigs, and its major oil export hub. In response, Iranian computer technicians took drastic actions, cutting off all Internet links to its computers. (See "First Stuxnet—Now the Flame Virus," *Availability Digest*; June 2012.)

1.4.3.9 Social Media

Social media, and in particular Facebook, has seen a new way of spreading malware. Facebook users get a message purporting to be from a friend that suggests they view a video. The video site requires users to install some software to see the clip, but actually it is a piece of malware. The malware is then free to cause whatever harm for which it was designed.

1.5 The Use of Redundant Systems to Detect Application Faults

1.5.1 Types of Application Faults

As described in the section "Application Faults," an erroneous result of a computing system is called an application fault. An application fault can be caused by a hardware fault, by a firmware fault, by a software fault, or by malware.

Some application faults may be caused by design or implementation errors in heavily used subsystems. These faults will become apparent in system testing and are easily corrected.

Other faults may be permanent (hard errors) but are located in functions of the system that are seldom used, such as error routines. These faults may not appear until many copies of the system have been in service for long periods of time. An example of such a fault was the failure of many Linux systems when a leap second was added to Universal Coordinated Time (UTC) in 2012 (see "2015—The Year of the Leap Second," *Availability Digest*; February 2015).

Still other faults may be transient (soft errors). They occur rarely and randomly. One example of a transient fault is a race condition. A race condition occurs when an application or the operating system attempts to do two or more operations at the same time, but the result is sensitive to the order in which the operations are performed. On rare occasions, the operations may not be performed in the proper order, resulting in an erroneous result. Another example of a transient fault is an error caused by a cosmic ray affecting the result of a hardware operation.

Finally, malware may cause application faults. In this case, the application fault may be a purposeful error in the output of the application (such as Stuxnet described in the section "Stuxnet"). Alternatively, it may cause additional outputs that represent data stolen from the system via malware (see the section "Backoff"). Malware may simply create a vulnerability that allows attackers access to the system so that they can infect the system with their own malware (see the section "Zeus").

1.5.2 Certified Testing

New systems are often tested by running a series of certified tests whose outputs are known to be correct on a properly implemented system. These tests are run on new systems to ensure that they are operating correctly. If one or more outputs of a new system do not match those of the test criteria, the system must be diagnosed to find and correct the problem.

1.5.3 Parity Checks

There are several techniques in use to catch or correct certain fault conditions. For instance, the contents of computer memory (either high-speed solid-state memory or disk memory) are often protected via a parity check. In this case, each item stored in memory has appended to it one or more bits that bear a logical relationship to the data item itself. If this logical relationship is found to be violated when such a data item is accessed from memory, the parity information can be used to flag an error, or in some cases to correct the error. A simple example of a parity check is to add one bit to each data item. The parity bit is chosen to make the number of "ones" in the data item, including the parity bit, to be always even (or odd). If a single bit error is made in such a data item, the parity check will fail and an error will be raised.

1.5.4 Voting Systems

Parity checks do not guarantee that application processing is correct. A common method to discover errors at the application-processing level is to use identical redundant subsystems. Each subsystem is processing the same information in parallel with the other processing subsystem(s). The outputs of the two or more subsystems are compared and are expected to be the same. If they are different, an error has been detected.

1.5.4.1 Dual Modular Redundancy

If the redundant system incorporates two identical subsystems (dual modular redundancy, or DMR), upon an error, each module may execute self-diagnostic routines to determine if it is at fault. If one of the subsystems sees that it is at fault, it removes itself from service, and the system proceeds with the one good subsystem. If neither subsystem finds an error, the system may continue as a DMR system, or one subsystem may be removed from service for further diagnostics.

1.5.4.2 Triple Modular Redundancy

If three or more subsystems are used in the redundant system, a voting mechanism is used. If there is a comparison error, the result obtained by the majority of the subsystems is accepted.

The subsystem(s) that did not agree with the majority are taken out of service. A common configuration is to use three systems (triple modular redundancy, or TMR). If two systems agree but one does not, the later system is taken out of service.

1.5.4.3 Logical Synchronization Unit (LSU)

The device that receives the output of two or more redundant systems for comparison is called a Logical Synchronization Unit, or LSU. A simple LSU in a TMR configuration is shown in FIG. 10. A common input (1) is given to all subsystems (2). The output of the subsystems are received by the LSU (3). If all outputs agree, this output is passed on (4). If the outputs do not all agree, the majority output wins and is passed on. The LSU may generate an error flag (5) indicating which subsystem(s) have been taken out of service.

If there are only two subsystems (a DMR configuration), the LSU cannot vote. It must declare both subsystems to be at fault. This may result in a system outage, or the subsystems may be able to perform self-diagnostic tests. If the result of such tests is that one subsystem declares itself to be at fault, the results of the other subsystem are passed on as the correct result.

1.5.5 Examples of Prior Art Redundant Systems to Detect Application Faults

1.5.5.1 HP NonStop Servers

HPE NonStop servers, available from Hewlett Packard Enterprise Co., Palo Alto, Calif., USA, are fault-tolerant, highly available systems. A NonStop server can contain two to sixteen logical processors. Each logical processor can be removed from the cabinet or inserted into the cabinet while the system is operational. Should a logical processor in which an application is running fail, the application is instantly restarted in another logical processor.

In the NonStop Advanced Architecture (NSAA), each logical processor is implemented in a DMR or a TMR configuration, as shown in FIGS. 11a and 11b (see "Breaking the Availability Barrier III: Chapter 16"). A DMR logical processor (FIG. 11a) contains two self-checking microprocessors (1) (2) that are both processing the same input data. Whenever the application wants to send data beyond the logical processor, the outputs of both microprocessors are compared by an LSU (3). If the outputs match, the logical processor releases the data. If the outputs do not match, the logical processor has failed and it is taken out of service. The logical processor is also taken out of service if one of the self-checking microprocessors discovers a fault within itself or if the LSU fails. As described above, all applications running in the failed logical processor are moved to a surviving logical processor.

In an NSAA TMR logical processor (FIG. 11b), the logical processor contains three self-checking microprocessors (1) (2) (3). When data is to be delivered by the logical processor, the outputs of the three microprocessors are compared by an LSU (4). If at least two out of three microprocessors agree, the majority output is delivered. If one microprocessor disagrees, it is taken out of service; but the logical processor remains in service. The logical processor fails if there are not two microprocessor outputs that agree or if the LSU fails.

Note that in the case of the NSAA architecture, a logical processor does not survive if it has only one microprocessor in service. This mode of operation is called fast fail. It ensures that an errant single microprocessor will not cause data corruption to the application database.

1.5.5.2 Stratus ftServer

The Stratus ftServer provides fault tolerance by using two identical processors (1) (2) shown in FIG. 12 that are lock-stepped at the memory access level. In normal operation, both logical processors are processing the same instruction stream and are comparing their results on every write to memory (3) (4). Whenever a processor must write to memory, it pauses and sends its memory-write operation to an LSU (5). When both processors have submitted their memory-write operations, the LSU compares them. Provided they agree, it is known that they are correct. The write-to-memory is approved (6) (7) and normal processing continues.

There are several processor failure modes:

i. One failure mode occurs when one of the processors, through its own fault-detection logic, recognizes that its operation is erroneous. In this case, it takes itself out of service, and the other processor carries on with normal processing. This "fast-fail" action ensures that the faulty processor will not propagate the error to external interfaces or to the database.

However, it is possible that this error was a transient error. Therefore, the failed processor will run a self-check diagnostic. If it passes the diagnostic, it returns itself to service and is resynchronized with the operational processor so that fault tolerance is restored. A count is kept of transient errors for each logical processor. Should this count exceed a specified limit, the processor is taken out of service and must be replaced.

ii. A second failure mode occurs when the two processors disagree, but neither has declared itself at fault. In this case, processing is paused; and the two processors each run their self-test diagnostic. If one should determine that it is indeed at fault, it is taken out of service (since the fault was detectable, it was not a transient fault).

iii. A third failure mode occurs when the two processors disagree, and both pass their self-diagnostic tests. In this case, the problem is likely to be a timing problem, such as two simultaneous interrupts being processed in different order. One logical processor is declared the winner, and the other is resynchronized with it. Operation in fault-tolerant mode continues.

Consequently, fault-tolerant operation continues so long as there are two good processors. Should one processor fail, the system continues on as a single non-fault-tolerant system until the failed processor is replaced.

1.5.5.3 Saturn Launch Vehicle

The Saturn Launch Vehicle Digital Computer (LVDC) provided the autopilot for the Saturn V rocket from launch to Earth orbit (see "Saturn Launch Vehicle Digital Computer," Wikipedia). For reliability, the LVDC used triple-redundant logic and a voting system, as shown in FIG. 13.

The computer included three identical processors (processor A (1), processor B (2), and processor C (3), as shown in FIG. 13). Each processor was split into a seven-stage pipeline (4) (5) (6). At each stage in the pipeline, an LSU (7) takes a majority vote of the results, with the most popular result being passed on to the next stage in all pipelines (8). If one of the three pipelines failed at any stage, the processor containing the failed pipeline remained in service. Thus, it was still a voting participant in later stages.

Consequently, for each of the seven stages, any one of the three pipelines could fail; and the LVDC would still produce the correct result.

1.5.5.4 The NASA Space Shuttle

Reliability through redundancy was imperative for the NASA (the U.S. National Aeronautics and Space Administration) space shuttle since astronauts lives were at stake. Reliability was accomplished by the use of four independent computers (1) (2) (3) (4) (FIG. 14) that were kept in lockstep synchronism and whose outputs were matched via a voting mechanism (see "Computers in Spaceflight: The NASA Experience," Chapter 4).

The computers were kept in synchronism by communicating with each other over a set of synchronization buses (5) (6) (7) (8), one for each computer. Whenever the program in a computer reached a point where it was going to accept an input, deliver an output command, or branch to a new process, it paused and sent a three-bit code over its synchronization bus. The three-bit code defined the current processing state of the computer, such as I/O complete.

Each computer monitored the synchronization codes of the other three computers. If a computer received an identical synchronization code from all of the other three computers, it resumed processing. If the synchronization code from one of the other computers did not match, or if one of the other computers hadn't responded within four milliseconds, the monitoring computer would declare that computer as having failed and would refuse to listen to it in the future. Under normal circumstances, the three good computers should have detected the single computer's error. The bad computer is announced to the crew so that it could kill the power to the bad computer.

This form of synchronization created a tightly coupled group of computers certifying that they are in the same place in the software. To certify that they are achieving the same solutions, a "sumword" was exchanged every 6.25 seconds over the synchronization buses. A sumword consisted of 64 bits of data, typically the least significant bits of the last outputs to the Space Shuttle's actuators. If there were three straight miscomparisons of the sumwords, the detecting computers declared the computer involved to have failed.

Finally, the outputs of all four computers were sent to a voting LSU (9) controlling the shuttle's control actuators (10). The LSU outvoted the commands of any failed computer.

1.6 What is Indestructible Scalable Computing?

Indestructible scalable computing (ISC) is a computer architecture that ensures that processing resources are always available to an application and that these resources can be scaled up or down to provide the necessary processing capacity for the application. Mission-critical user services are always available, even during single system failures (servers or storage arrays), network failures, data center disasters, and planned maintenance on systems, applications, and infrastructure.

Previously, ISC was achieved via the use of active/active systems. An active/active system comprises two or more processing nodes cooperating in a common application. A transaction can be sent to any node for processing and will be treated the same as if it were sent to any other node. The databases of the nodes in an active/active system are kept synchronized via bidirectional data replication. However, there is no mechanism in an active/active system to guarantee data integrity, especially if scaled into the public cloud.

1.7 What is Needed

In the prior art, if there is a design or implementation fault in a system or if it has been infected with malware, it may be some time before the system's improper operation is noticed. It is therefore often important that means be provided to detect such anomalies quickly.

The prior art for ensuring that the computational results of a computing system are valid depends upon using a Logical Synchronization Unit (LSU) to compare the outputs of two (dual modular redundancy, or DMR), three (triple modular redundancy—TMR) or more identical subsystems.

If there is a mismatch in the outputs of a DMR configuration, the system fails and suffers an outage. Alternatively, each subsystem of the DMR system may run diagnostics. If one system fails its self-checking diagnostics, it is taken offline and the system can continue processing with only a single subsystem.

If there is a mismatch in a TMR system, the subsystem generating the erroneous output is taken offline and the system continues on as a DMR system.

The prior art using an LSU faces several challenges:
i. The Logical Synchronization Unit (LSU) is a single point of failure. If it fails, the entire system suffers an outage.
ii. In order to minimize LSU outages, it is important to keep the LSU simple so that there is very little circuitry that can fail, thus improving its availability.
iii. A design incorporating a simple LSU can only match (or vote on) simple inputs to the LSU.
iv. If an error is caused by a malicious hardware, firmware, or software implementation, the LSU will not detect it as the same error will exist in all subsystems.
v. A major class of systems that can benefit from this technology are online transaction-processing systems. The unit of comparison for these systems is the complex set of changes that a transaction will apply to the application database. This would require a very complex LSU.

What is needed is a method that:
i. has no need for an LSU. Therefore, a single point of failure has been eliminated.
ii. allows the data used to verify proper operation of the system to be arbitrarily complex.
iii. provides for the detection of errors that result from the design or implementation of hardware, firmware, or software without significantly impacting the processing speed of the system.
iv. provides for the detection of a malicious design of hardware, firmware, or software.
v. provides for the detection of malicious operation due to a malware infection.
vi. guarantees the integrity of transaction-processing systems that make complex changes to the application's database.
vii. is useable to certify the correctness of a new or upgraded system.
viii attains real-time transactional integrity in an ISC cloud.

Specifically related to the last point, a method is needed to provide an ISC architecture that guarantees data integrity wherein no single fault shall result in an erroneous update to the application database. Furthermore, the ISC system should be deployable to a cloud environment to achieve reliability (i.e., data integrity), availability, and scalability. The ISC system should accomplish these objectives with no requirement for application modifications.

BRIEF SUMMARY OF THE INVENTION

It is the purpose of this invention to provide methods to verify the computational results of a transaction processing system. A transaction is allowed to modify an application's state only if the validity of the result of the processing of the transaction is verified. Otherwise, the transaction is ignored and an error indication is generated.

The present invention teaches a method to determine if a computing system is behaving improperly without the need for an LSU. The improper behavior of a system could be due to a hardware fault; a fault in the design or implementation of the hardware, firmware, or software comprising the system; a malicious modification of the design of the hardware, firmware, or software; or the infection of the system by malware.

The method uses a Heterogeneous Indicia Engine (HIE). In an HIE configuration, two or more computing subsystems of different manufacture process a series of inputs. The output of each such subsystem is represented by indicia calculated by an Indicia Engine embedded in the subsystem. Each subsystem sends its indicia to the other subsystems in the HIE configuration. Each subsystem compares its indicia with those of the other subsystems. If there is a mismatch, the majority wins. The subsystem(s) whose indicia does not match the majority value is taken out of service for further diagnostic tests.

If there are only two subsystems in the HIE configuration and there is a mismatch of indicia, both may enter self-diagnostic tests. If one fails its diagnostic test, it is taken out of service. If a self-diagnostic test is not available for a subsystem, it takes itself out of service.

For a transaction processing system, each subsystem can perform its processing up to the indicia comparison and commit the transaction only if the comparison is valid. This is the verify-before-commit HIE method. Alternatively, each system can commit the transaction before the comparison test. In the event of a mismatch, the transaction in error must be rolled back. This is the commit-before-verify HIE method.

The HIE configuration can also be used to certify a new or upgraded system before it is put into service.

In one preferred embodiment, a method is provided of ensuring application transaction integrity in a multi-node system. The multi-node system includes a parent node and a plurality of child nodes. Each node includes (i) a processor, (ii) an application executing in the processor, (iii) an indicia engine that includes an Extractor function which reads an audit trail located at the child node, a Consumer function which is fed audit trail data by the Extractor function, and a Coordinator function which is able to join transactions executing on the child node, and (iv) an instance of a database used by the application. Each child node executes transactions. Each transaction includes a BEGIN step, one or more data manipulation language (DML) or data definition language (DDL) operations, and a transaction END step which is either a COMMIT or an ABORT. The method operates as follows:
  (a) The parent node sends to at least two child nodes an identical request to process a transaction.
  (b) Process in the application executing in the processor at each of the at least two child nodes the identical request in the instance of the child node's database up until the transaction END step.
  (c) The indicia engine at each of the at least two child nodes includes:
    (i) the Coordinator function at the child node which joins the transaction being executed at the child node,
    (ii) the Extractor function which reads the audit trail of the child node and sends it to the Consumer located on that child node,
    (iii) the Consumer function which computes indicia of the outcome of the processing of the identical request in step (b), wherein the indicia is dependent upon at least a subset of the DML or DDL operations, and
    (iv) one of the set of Extractor, Consumer, and Coordinator functions sends the computed indicia to the parent node.
  (d) The parent node compares the received computed indicia from the at least two child nodes.
  (e) The parent node instructs the Coordinator at the at least two child nodes to complete their respective transaction END steps for the transaction in the application executing in the processor at each of the at least two child nodes to:
    (i) vote to COMMIT when the result of the comparison in step (d) indicates that the processing in step (b) was correct, and
    (ii) vote to ABORT when the result of the comparison in step (d) indicates that the processing in step (b) was incorrect.

The comparing of the computed indicia occurs independently of any checking as to whether an application on a child node is ready to commit via a commit process.

The parent node includes a Transaction Duplicator function.

Definitions

The following definitions describe the use of certain terms in this specification. They are hierarchically ordered in that each definition builds on previous definitions.

Table—A set of data values that is organized using a model of horizontal rows and vertical columns. The columns are identified by name, and the rows are uniquely identified by the values appearing in a particular column subset (the table's primary key). A table usually characterizes an entity set. Each row in the table describes an instance of the entity set. Each column describes an attribute of the entity set.

File—The equivalent of a table for nonrelational databases. A file is made up of records, and each record describes an entity instance. A record is made up of fields, each of which describes an attribute of the entity set. In this specification, the term "table" is to be interpreted as "table and/or file."

Column—A table component that holds a single attribute of the entity set, such as SALARY.

Field—A file component that holds a single attribute of the entity set, such as SALARY. In this specification, the term "column" is to be interpreted as "column and/or field."

Row—A table component that represents an entity instance. It is a sequence of {column name, value} pairs implemented as a sequence of values positioned according to their corresponding column names. For instance, (EMPLOYEE, 235), (NAME, Joe Smith), (DEPARTMENT, Sales), (SALARY, $30,000).

Record—The same as a row, but "row" is usually used for relational databases; and "record" is usually used for file systems. In this specification, the term "row" is to be interpreted as "row and/or record."

Database—A collection of related tables or files.

Data Manipulation Language (DML)—The operations that control the contents of a database, such as insert, update, delete, and read a row or record.

Data Definition Language (DDL)—The operations that control the structure of a database, such as add or delete a column or a table.

Computer—The combination of a central processing unit, high-speed memory, persistent storage, a communication subsystem, and operating system software.

Computing System—A computer.

Application—A useful function implemented via a computing system.

End Users—People, systems, devices, applications, or any other entity that can influence an application or use the services that it provides.

Program—An executable set of programming code for providing a specific function.

Process—A program running in a computer. One program can be spawned as multiple named processes.

Hardware—The physical computational device in a computing system upon which a program executes.

Software—The series of computer instructions (programming code) that implements a program.

Firmware—Software code that is stored in persistent memory. Firmware includes the operating system environment that loads and executes the Software.

Persistent Storage—Computer memory that is not lost due a computer failure or due to the system being powered down. Persistent storage is usually implemented as hard disk or as solid-state persistent memory.

System—A set of software and firmware (an application) running on a hardware platform to provide a useful function to end users. A System may be running as a partition or virtual machine along with other systems in a piece of hardware.

Server—A system. In this specification, "system" and "server" are used interchangeably.

Subsystem—A server that is part of a larger system.

Malware—A malicious modification of hardware, software, or firmware that causes a system to perform in ways not intended by the original design.

Distributed Denial of Service (DDoS)—A form of malware that renders a website inoperable by sending it vast amounts of traffic.

DDoS—See Distributed Denial of Service

Transaction—A delimited set of database operations (for example inserts, updates, deletes) that are either all made or none are made. A transaction is guaranteed to leave the database in a persistent, consistent, and correct state; and its results are typically guaranteed to survive any system failures.

Before Image—The value of a data item in a database before a database operation is executed against it.

After Image—The value of a data item in a database after a database operation is executed against it.

ACID Properties—Transactions maintain the ACID properties of atomicity, consistency, isolation, and durability. Atomicity means that either all operations contained within the transaction are executed against the database or that none are. Consistency means that at any time, the view of the database represents an accurate view of the application data. Isolation means that a transaction is unaffected by other transactions that are executing simultaneously. Durability means that the resulting modification to the database by a transaction will survive any subsequent system failures.

Begin Transaction—A directive that indicates the beginning of a transaction. A begin transaction directive may be explicit, or it may be implicit with the first database operation for a transaction.

Commit Transaction—A directive that indicates that a transaction has successfully completed and should be made durable.

Abort Transaction—A directive that indicates that a transaction has been unsuccessful and should be undone (i.e. rolled back) and have no effect on the database. Also, called simply an "Abort" or "Rollback."

Database Rollback—A method for undoing database transactions that have been previously committed by rolling back the transaction operations to a prior state. This is in contrast to an Abort Transaction which rolls back an in-flight transaction.

Transaction Manager—A facility for ensuring that transactional updates to a database maintain the ACID properties.

Change Log—A sequential list of all changes made to a database.

Online Transaction Processing (OLTP)—A system for processing transactions in real time.

OLTP—See Online Transaction Processing.

Data Replication—The propagation of changes from a source database to a target database or application intended to keep the target database in synchronization with the source database.

Replication is often accomplished at the transaction level.

Data Replication Engine—A facility for replicating source database changes to a target database or application.

Bidirectional Data Replication—Replicating data between two systems in both directions. If a change is made to the database of either system, it is replicated to the other system.

Replication Latency—The time from when a database change is applied to a source database to the time that it is applied to the target database.

Asynchronous Replication—A data replication method in which data is replicated after it has been applied to the source database. The target database will lag the source database by the replication latency of the replication engine.

Synchronous Replication—A data replication method in which data is replicated to the target database in synchronism with the updates to the source database. Replication latency is zero. However, application performance deteriorates depending upon the distance between the source and target systems.

Application Latency—The deterioration in application response times as a result of synchronous replication.

Coordinated Commits—A synchronous replication technique that eliminates or reduces the problems of replication latency and application performance deterioration.

Commit Token—An indicator replicated to the target system to instruct it to commit a transaction.

Abort Token—An indicator replicated to the target system to instruct it to abort a transaction.

Extractor—A data replication engine component that reads database changes from a change log and sends them to the target system over a communication channel. Also called a Collector.

Applier—A data replication engine component that receives changes made to a source database and applies them to a target database. Also called a Consumer.

Heterogeneous Indicia Engine (HIE)—Also referred to as an "Indicia Engine" or a "Validation Engine", is an engine that ensures the transaction integrity of transaction processing systems by comparing the results from two or more instances of the same application. The instances may be the same application code running on the same type of system hardware (i.e. a homogeneous form of HIE) or may be different hardware and/or software application code (i.e. the more general form of heterogeneous HIE). The special homogeneous form of HIE could be running on partitions or virtual machines in a single node.

HIE—See Heterogeneous Indicia Engine.

Indicia Engine—See Heterogeneous Indicia Engine.

Validation Engine—See Heterogeneous Indicia Engine.

DMR—Dual modular redundancy. Two systems performing the same functions organized so that they monitor each other's output to detect faults.

TMR—Triple modular redundancy. Three or more systems performing the same functions so that they monitor each other's output to detect faults.

Indicia Matching—The coordinated computation of two or more computers can be verified to be correct by calculating indicia based on intermediate or final results and comparing the indicia of the various computers.

RAIC—Redundant Array of Inexpensive Computers. A group of inexpensive computers that can cooperate to ensure that calculations are correct via indicia matching.

Parent Node—The controlling node in a RAIC array.

Child Node—A subordinate node in a RAIC array. A Child Node can also be a Parent Node if a transaction is cascaded further and some or all transaction steps or operations are delegated to grandchild nodes.

Transaction Duplicator function—This is a subset of functionality of the Parent Node which picks Child Nodes from among the available Child Nodes to send duplicate transaction requests. The selection may be hard-coded, configured at start up, or dynamic based upon load or other system factors. Further, the Transaction Duplicator in certain embodiments may be called upon to match indicia from the selected Child Nodes.

BRIEF DESCRIPTION OF THE DRAWINGS

Preferred embodiments of the present invention will now be described by way of example with reference to the accompanying drawings:

FIG. 1 shows the prior art organization of a computer application.

FIG. 2 shows the prior art inclusion of a transaction manager in a computer application.

FIG. 3 shows the prior art commit of a transaction on a single system.

FIG. 4 shows a prior art high-availability active/backup configuration.

FIG. 5 shows a prior art continuously available active/active configuration.

FIG. 6 shows a prior art data replication engine.

FIG. 7 shows a prior art method to replicate a database to a remote database using asynchronous replication.

FIG. 8 shows a prior art method to replicate a database to a remote database using synchronous replication.

FIG. 9 shows a prior art method to replicate a database to a remote database using coordinated commits.

FIG. 10 shows a prior art Logical Synchronization Unit (LSU) used to compare the outputs of two or more subsystems.

FIGS. 11a and 11b show the prior art use of an LSU by the HP NonStop fault-tolerant server.

FIG. 12 shows the prior art use of an LSU by the Stratus ftServer.

FIG. 13 shows the prior art use of LSUs by the Saturn Launch Vehicle Digital Computer.

FIG. 14 shows the prior art use of an LSU by the NASA Space Shuttle.

FIGS. 15a and 15b show the architecture of the Heterogeneous Indicia engine (HIE) in accordance with a preferred embodiment of the present invention.

FIG. 16 shows the structure of an application being tested with an Indicia Engine in accordance with a preferred embodiment of the present invention.

FIG. 17 shows a flowchart for the Heterogeneous Indicia engine in accordance with a preferred embodiment of the present invention.

FIG. 18 shows a flowchart for the HIE Verify-Before-Commit method in accordance with a preferred embodiment of the present invention.

FIG. 19 shows a flowchart for the HIE Commit-Before-Verify method in accordance with a preferred embodiment of the present invention.

FIG. 20 shows a flowchart for the use of HIE to certify a new system in accordance with a preferred embodiment of the present invention.

FIG. 21 shows a flowchart for an alternative embodiment of HIE in accordance with a preferred embodiment of the present invention.

FIG. 22 shows the architecture of a RAIC array.

FIG. 23 shows bursting an application to a single cloud for scalability.

FIG. 24 shows bursting an application to multiple clouds for scalability and additional reliability.

FIG. 25 shows the RAIC method where the Child Nodes located in the cloud check indicia for correctness.

FIG. 26 shows the RAIC method where the Parent Node checks the Child Node indicia for correctness.

FIG. 27 shows a preferred embodiment of the internal structure of the HIE for achieving data integrity via the HIE accomplishing the indicia matching.

FIG. 28 shows an embodiment of the internal structure of the HIE for achieving data integrity via the Transaction Duplicator accomplishing the indicia matching.

FIG. 29 shows the flowchart for indicia matching by the Coordinators.

FIG. 30 shows the flowchart for indicia matching by the Transaction Duplicator.

DETAILED DESCRIPTION OF THE INVENTION

Certain terminology is used herein for convenience only and is not to be taken as a limitation on the present invention.

The present invention eliminates the need for an LSU as used in the prior art. Rather, two or more subsystems, preferably of different manufacture but meeting the same functional specifications, exchange application state information as their processing of a transaction progresses. If a mismatch in the application state of the subsystems is detected, an error indication is generated indicating that one of the systems is behaving differently and may be faulty. In a DMR configuration, it is not known which system is at fault; and they can both be shut down. In a TMR system, the subsystems vote and accept the majority result. The faulty subsystem is shut down.

A. The Heterogeneous Indicia Engine

The present invention uses a Heterogeneous Indicia Engine (HIE) to perform these tests. As shown in FIGS. 15a and 15b, the Heterogeneous Indicia Engine uses two or more subsystems of different manufacture (1) that are doing the same work. Periodically, the subsystems exchange information, which are called indicia (2), about their current application states. Indicia are described in more detail later. Each subsystem may be independently designed and implemented by different groups or different companies. The independent design and implementation applies separately to the hardware, the firmware, and the software of each subsystem. This ensures that a design error or an implementation error or a malware error maliciously induced during manufacture does not appear in more than one system. Alternatively, it may be just the software that is being tested. In this case, the software for the application may have been developed by different groups.

An HIE configuration can also be used to detect malicious outputs caused by malware that has infected the system.

In a DMR HIE system (FIG. 15a), each subsystem (1) periodically receives the indicia (2) from the other system. If the indicia do not match, an error indication is generated and the subsystems may be taken out of service. Alternatively, each subsystem may run self-diagnostic tests. If one subsystem fails its diagnostic test, it is taken out of service and the other subsystem continues with its processing. The failed subsystem also may be kept in service under the assumption that the error was a transient fault. This subsystem is monitored and if it continues to show faults, it is then taken out of service. If both subsystems fail their diagnostic tests they both are taken out of service.

In a TMR HIE system (FIG. 15b), there are three (or more) subsystems (1). Each subsystem receives the indicia of the other subsystems (2) and matches them against its own indicia. If all indicia match, the operation was performed properly by all subsystems, and each proceeds with its own processing. If all indicia do not match, those with the majority indicia proceed with their processing and ignore any further indicia from the losing subsystem(s). A losing subsystem is taken out of service or is handled by whatever error processing the system provides.

The structure of an application being tested with an Indicia Engine is shown in FIG. 16. Two (or more) subsystems (1, 2) are executing the same application. Each subsystem comprises a computer (3) that includes random high-speed memory (4) for use by the applications running in the computer. Each computer also contains persistent storage (5) for the long-term storage of data and a communications facility (6) for communicating with external devices. Application software running in each subsystem may have been developed by separate groups, as has the hardware and firmware of the two subsystems (alternatively, only the software may have been independently developed if the intent is only to test the validity of a software implementation).

Embedded in each application, or the System operating system or hardware running the application, to be verified (7) is an Indicia Engine (8). The Indicia Engines in the different subsystems communicate with each other via a communication link (9).

At specific synchronization points in the processing flow, each application pauses while the two Indicia Engines calculate and exchange indicia (10) representing the applications' current state of computation. Indicia is a representation, often in a compact form such as a hash or checksum, of a complex set of data. For instance, it may be a hash sum or checksum of the data it represents. The hashing algorithm is chosen to ensure that there is a vanishingly small probability that two different data sets will result in the same hash sum. Alternatively, the indicia may be the full data set with no computational modification.

The indicia may be calculated over the entire data set that represents the current state of the system, it may be just a subset of that data, or it may be a set of indicia representing portions of the current application state.

In an HIE configuration, there is no central LSU. Rather, the comparison of the indicia is performed independently by the Indicia Engines that have been embedded into each subsystem.

A generalized flowchart for a DMR HIE configuration is shown in FIG. 17. The HIE system comprises two systems, Subsystem A (1) and Subsystem B (2). A common input request (3) is received by both subsystems. Each subsystem will process the request (4) and submit its response to its Indicia Engine (5) to compute indicia representing the result (6). The indicia will be exchanged between the subsystems (7). Each subsystem will compare its indicia with that of the other subsystem (8). If the two indicia are identical, each subsystem will continue processing or will issue its response via a response joiner (9). If the indicia do not match, each subsystem performs whatever error processing has been specified (10), such as entering a self-diagnostic test, notifying a system administrator of the error, and/or shutting down.

1.8 Applicability to Online Transaction Processing Systems

The following descriptions of an HIE system are for a DMR transaction-processing system. In a transaction-processing system, the scope of the response is not simply a write to the database. One write could be executed properly by both systems; but if some other database write included in the transaction succeeded in one subsystem but failed in the other subsystem, it is not sufficient to just roll back the bad write. The entire transaction must be rolled back. Thus, the scope of the response is all of the database and processing activity required by the transaction; and the indicia must be calculated based on the entire set of database updates made by the transaction. Only if the indicia calculated by both subsystems agree is the transaction allowed to be committed. If the indicia disagree, the transaction must be aborted.

An HIE for a transaction-processing system may take one of two forms:
 i. Verify before commit (the preferred embodiment).
 ii. Commit before verify.

1.8.1 Verify Before Commit

In a verify-before-commit HIE system, the operations that are to be made by each subsystem are compared via their indicia before the transaction is committed on either subsystem. The transaction is committed only if the indicia compare (match). FIG. 18 provides a flowchart depicting a general approach to an HIE verify-before-commit system.

The system comprises two transaction-processing subsystems, Subsystem A (1) and Subsystem B (2). The subsystems each receive a request to process (3), and they process that request against the database as a transaction (4). However, before they commit the transaction, the subsystems submit the data set that they will use to update their databases to the Indicia Engine (5). This data set will typically be the set of DML or DDL activity (e.g. inserts and/or updates and/or deletes) to the database within the scope of the transaction.

The first task for the Indicia Engine in each subsystem is to calculate the indicia (6). For a transaction processing system, this may be a hash sum of the updates to be applied to the database as a result of the transaction.

It is the responsibility of the Indicia Engine to determine whether the indicia calculated by each subsystem are identical. One method to do so is via a coordinated commit procedure as described in the section "Coordinated Commits". It sends its computed indicia to the other subsystem for comparison via a Request to Commit (RTC) token (7). When it has received the RTC token from the other subsystem, it compares the two indicia (8). If they compare, the Indicia Engine responds to the RTC token from the other subsystem with an RTC Resolution message (9) indicating a comparison. If the two indicia are not the same, the RTC Resolution message indicates a comparison error.

The Indicia Engine compares the result obtained in the RTC Resolution message from the other subsystem with its own result (10). If both subsystems indicate that the indicia compare, the transaction is committed (11) and the subsystem generates the intended response (12). If either or both subsystems indicate that the indicia did not compare, error processing is performed by the subsystem(s) (13). This could be the execution of self-diagnostics, or the shutdown of the subsystems.

Normally, both subsystems will either declare a comparison or will declare a comparison error. If one subsystem determines that the indicia compare but the other subsystem indicates that they do not compare, both systems go into their error processing. This anomalous behavior could be caused by malware infecting one system and making it always generate a compare RTC Resolution message.

In an alternative embodiment of this method, the RTC tokens containing the indicia and the RTC Resolution messages that are exchanged between the two subsystems can be encrypted. The receiving subsystem will decrypt the messages received from the other subsystem before processing them. This prevents a "man-in-the-middle" attack in which malware can intercept these messages and change them before forwarding them on to the receiving subsystem (for instance, changing a "no-compare" RTC Resolution message to a "compare" message).

The flowchart of FIG. 18 shows the response of the two systems being combined into a single response. This requires a "response joiner" to accept the two responses and to generate a single response. However, the response joiner represents a single point of failure. Should it fail, no response will be generated. An alternative embodiment assigns a priority to each subsystem. The surviving subsystem with the highest priority will deliver the response, and the other subsystems will inhibit their responses.

1.8.2 Commit Before Verify

In a commit-before-verify HIE system, each subsystem commits its transaction before verifying the results with its companion subsystem. This means that the results are made available to the rest of the system where they were generated before the comparison is made, allowing subsequent processing to potentially continue in parallel with the comparison step. By contrast, the Verify Before Commit approach does not typically make the results available until after the comparison is made, thereby potentially slowing down overall processing for the transaction by the latency time it takes to do the comparison.

FIG. 19 provides a flowchart depicting a general approach to an HIE commit-before-verify system.

The system comprises two transaction-processing subsystems, Subsystem A (1) and Subsystem B (2). The subsystems each receive a request to process (3). Each subsystem processes the request (4) and commits (or aborts) the transaction (5).

If the result of the transaction processing was to commit the transaction, each subsystem submits the resulting operations that it performed on the database to its respective Indicia Engine (6). These Indicia Engines are identical to those described above in the section "Verify Before Commit." The first task for the Indicia Engine in each subsystem is to compute the indicia (7). For a transaction processing system, this may be a hash sum of the updates to be applied to the database as a result of the transaction.

It is the responsibility of the Indicia Engine to determine whether the indicia calculated by each subsystem are identical. One way it may do so is via a coordinated commit procedure as described in the section "Coordinated Commits". It sends its computed indicia to the other subsystem for comparison via a Request to Commit (RTC) token (8). When it has received the RTC token from the other subsystem, it compares the two indicia (9). If they compare, the Indicia Engine responds to the RTC token from the other subsystem with an RTC Resolution message (10) indicating a comparison. If the two indicia are not the same, the RTC Resolution message indicates a comparison error.

The Indicia Engine compares the result obtained in the RTC Resolution message from the other subsystem with its own result (11). If both subsystems indicate that the indicia compare, the subsystem generates the intended response (12). If either or both subsystems indicate that the indicia did not compare, the committed database transaction is rolled back (13) and error processing is performed by the subsystem (14). This could be the execution of self-diagnostics, or the shutdown of the subsystem. A Database Rollback can be accomplished via the Shadowbase Undo utility (see U.S. Pat. No. 8,909,604 (Holenstein et al.)).

In an alternate embodiment, the Indicia Engine performs a self-diagnostic series of tests when a mismatch occurs prior to the Database Rollback and error processing.

Normally, both subsystems will either declare a comparison or will declare a comparison error. If one subsystem determines that the indicia compare but the other subsystem indicates that they do not compare, both systems go into their error processing. This anomalous behavior could be caused by malware infecting one system and making it always generate a compare RTC Resolution message.

In an alternative embodiment of this method, the RTC tokens containing the indicia and the RTC Resolution messages that are exchanged between the two subsystems can be encrypted. The receiving subsystem will decrypt the messages received from the other subsystem before processing them. This prevents a "man-in-the-middle" attack in which malware can intercept these messages and change them before forwarding them on to the receiving subsystem (for instance, changing a "no-compare" RTC Resolution message to a "compare" message).

The flowchart of FIG. 19 shows the response of the two systems being combined into a single response. This requires a "response joiner" to accept the two responses and to generate a single response. However, the response joiner represents a single point of failure. Should it fail, no response will be generated. An alternative embodiment assigns a priority to each subsystem. The surviving subsystem with the highest priority will deliver the response, and the other subsystems will inhibit their responses.

1.8.3 Certifying a New or Upgraded Subsystem

If a new or upgraded subsystem is to be added to a system, its operation can be validated by using the HIE method to compare its operation to that of a trusted subsystem that is known to be correct. Alternatively, this procedure can be used to validate a new or upgraded subsystem before it is released for independent use or as a subsystem in another system.

The use of the HIE commit-before-verify method to certify a new system is shown in FIG. 20. A known and trusted Subsystem A (1) is used to compare the computational results of a new Subsystem B (2). Each subsystem receives a request (3) and processes the corresponding transaction (4). Upon the completion of processing, each subsystem commits its transaction.

At this point, the results of each subsystems' computation is passed to its Indicia Engine (5). Each Indicia Engine computes indicia (6), and the new Subsystem B sends its indicia to the trusted Subsystem A via an RTC token (7).

Subsystem (A) compares the indicia generated by Subsystem B to that generated by its Indicia Engine (8). If the two indicia are the same (9), Subsystem A is finished with its processing (10) and waits for the next request.

If the indicia of the two subsystems do not match, Subsystem A will generate an error condition (11) indicating an error in the logic (hardware, firmware, software, or malware) of Subsystem B. Subsystem B can then be taken out of service for further diagnostics.

In an alternative embodiment of this method, the RTC token containing the indicia generated by the subsystem under test can be encrypted. The trusted subsystem will decrypt the RTC token received from the new subsystem before processing it. This prevents a "man-in-the-middle" attack in which malware can intercept tokens and change them before forwarding them on to the trusted subsystem.

1.8.4 An Alternative Embodiment for HIE

An alternative embodiment for HIE is shown in FIG. 21. Two subsystems, Subsystem A (1) and Subsystem B (2) are employed in an HIE configuration. The hardware, firmware, and software have all been developed by different groups so that a design or implementation error or embedded malware in one will not be present in the other. (If only the application software is to be tested, then only the software needs to be developed by different groups.)

An input request (3) is sent to Subsystem A. Subsystem A sends the request to Subsystem B via a data replication engine (4). Both subsystems process the request as a transaction (5, 6). Before committing or aborting the transaction, Subsystem B sends its results to Subsystem A via a data replication engine (7). Subsystem B's results typically may be the before and/or after images of the updates that Subsystem B plans to make to its database, or they could be any other set of data representing the results of Subsystem B's processing of the request.

When Subsystem A receives Subsystem's B results, it compares these results with its own results (8). If the results compare, a commit directive (9) is sent to Subsystem B. Subsystem A commits its transaction (10) and sends its response to the request (11).

If the results do not compare, Subsystem A sends an abort directive (12) to Subsystem B. Subsystem A will then abort its transaction (13) and generate an error indication (14) indicating that the two subsystems failed to agree upon the processing of the request.

Subsystem B receives the directive from Subsystem A and determines whether it was a commit directive or an abort directive (15). If the directive from Subsystem A was a commit directive, Subsystem B will commit its transaction (16). If it was an abort directive, Subsystem B will abort the transaction (17).

1.9 Detecting Malware

Since the two subsystems in an HIE system are based on independent hardware, firmware, and software design and implementations, it is unlikely that each would be infected with the same malware at the same time. Therefore, the HIE verify-before-commit or the HIE commit-before-verify methods can continually test for an infection of a subsystem by malware that changes the processing flow of the subsystem. If such malware finds its way into a subsystem, it will generate an output that is different from the output of the uninfected subsystem (or different from the output of the other subsystem if it also is infected by different malware). An online antivirus scan can be applied to both subsystems to find the malware, or the system (both subsystems) can be shut down so that the malware can be detected and removed.

Using HIE, a system can also be checked to detect any anomalies in processing that might have been incorporated during the design or implementation stage of the hardware, firmware, or software of a subsystem. Since the intent of such anomalies generally is to change the output of the subsystem, any differences in output will be detected by HIE.

One example of malware that HIE would detect is a scheme that has been found in banking applications. When calculating interest due an account, the interest is often not an even number of cents. For instance, at 6.2%, the interest on an account holding $567 would be $35.154. The interest truncated to the nearest penny is $35.15. This is the amount that is added to the account. This leaves $0.004, which is called overage. The overage generally is added to a special account held by the bank. In this scheme, the software is modified so that a portion of the overage is added to an attacker's account and the remaining amount is added to the bank's overage account. The amount is so small that it is often not caught in an audit. However, over millions of transactions, this stolen amount represents a sizeable sum for the attacker.

By using an HIE system, both the transaction that is updating the bank's account and the transaction that is updating the attacker's account would be flagged as an error; and the malware could be removed (and the hacker apprehended).

1.9 Ensuring Real-Time Transaction Integrity when Scaling to the Cloud

A set of inexpensive commodity computers can be embedded in the cloud. This array of computers is herein known as a 'Redundant Array of Inexpensive Computers,' or RAIC. The RAIC can be configured to ensure the validity of transactions presented to a Parent Node, as shown in FIG. 22.

The Parent Node has access to the RAIC. There are at least two subordinate processing nodes (Child Nodes) in the RAIC, though three or more nodes are preferred to ensure continued operation should one of the Child Nodes fail. When the Parent Node wants to process a request, it sends the request (1) to each of the Child Nodes in the RAIC designated to work on the transaction. Each Child Node calculates its response to the request and either i) compares the indicia of its result with those of the other Child Nodes (2), or ii) sends the indicia to the Parent Node for comparison as disclosed later in this section. The indicia can either be a representation(s) of the end result of the calculation or of an intermediate result as described earlier in the Detailed Disclosure. In the case of three or more Child Nodes involved in a transaction, there will be more than one occurrence of indicia matching.

If the indicia of all the Child Nodes match, either i) the Child Nodes send their conclusion about the indicia matching to the Parent Node (3) and commit the transaction, or ii) if the Parent Node is designated to do the matching the Child Nodes send the indicia and the Parent Node does comparison, and if all indicia match, it instructs the Child Nodes to commit the transaction. However, if the indicia do not match, either i) The Child Nodes decide to abort the transaction, or ii) the Parent Node instructs the Child Nodes to abort the transaction.

If there are more than two Child Nodes, and if the indicia from a majority of the Child Nodes agree, the rule could be for the agreeing Child Nodes to commit the transaction. That decision could either i) happen in the Child Nodes, or ii) in the Parent Node with instructions then sent to the Child Nodes. A Child Node with non-matching indicia can be rebooted, replaced, or restarted for application processing. Other actions, such as virus malware removal, may be attempted to correct whatever problem prevented the disagreeing Child Nodes from agreeing with the majority.

An application may be scaled by moving some of its processing to a cloud via RAICs. To ensure the reliability of the transaction outcome, its correctness, and the availability of the application, RAIC nodes may be deployed in the cloud as child nodes in redundant pairs (or groups of three or more), as shown in FIG. 23. Each RAIC node computes its indicia and compares that with its companion node(s) or returns the indicia to the parent node. As long as the indicia agree, the RAIC computations are correct; and the transaction processing results can be returned by the Parent Node to the transaction requestor. If the indicia do not agree, one or more of the RAIC nodes is faulty and must undergo tests or other measures to determine and rectify the problem.

To protect against cloud failures, the redundant pairs of RAIC nodes can be deployed to separate clouds, as shown in FIG. 24. For maximum protection, independence, and reliability, these clouds should be from separate providers such as Amazon, Microsoft, or Google. The Parent Node may also be located at one of the cloud provider locations.

As previously explained, the indicia calculated by the RAIC nodes can be compared and validated either by the RAIC nodes themselves or by the Parent Node. FIG. 25 shows a flowchart in which the RAIC (Child) nodes verify the indicia. A transaction received by the Parent Node is sent by the Parent Node to each of the Child Nodes participating in the transaction (usually two or three). Each Child Node processes the transaction and computes indicia. The Child Nodes then compare their indicia. If all indicia match, the Child Nodes commit the transaction. If the indicia do not match, the Child Nodes abort the transaction. The commit or abort result is returned to the Parent Node, which returns the result to the transaction requestor.

FIG. 26 shows a flowchart in which the Parent Node checks the indicia calculated by the Child Nodes. A transaction received by the Parent Node is sent to a plurality (usually two or three) of the Child Nodes. The Child Nodes process the transaction and create indicia of their results. The Child Nodes send their indicia to the Parent Node, which compares them.

If the indicia do not match, the Parent Node instructs all Child Nodes to abort the transaction. If all indicia match, the Parent Node instructs the Child Nodes to commit the transaction. Each Child Node attempts to commit the transaction and informs the Parent Node of its success or failure. If all Child Nodes successfully commit the transaction, or if they were instructed to abort the transaction, the Parent Node responds to the transaction requestor with the result. If the Child Nodes were instructed to commit the transaction, but one or more nodes was unsuccessful in doing so, special error processing is invoked.

Alternatively, the Child Nodes can independently commit or abort the transaction before reporting their results to the Parent Node. If all Child Nodes agree on the commit or abort, no further action need be taken. However, if some Child Nodes committed the transaction and other Child Nodes aborted the transaction, the Parent Node reboots, replaces, or restarts, among other actions, the Child Nodes that aborted the transaction. Alternatively, the Parent Node can instruct all Child Nodes to abort the transaction (or roll it back if it had been committed).

1.20 Guaranteeing Data Integrity in ISC

A diagram of one preferred embodiment of the indicia comparison method is shown in FIG. 27. Two independent systems (Child Nodes) are provided to process each transaction. These are designated as System\Left and System\Right in FIGS. 27 and 28.

When a transaction is entered by a system user, a Transaction Duplicator function residing in the Parent Node picks the Child Nodes, then routes the transaction to application copies in both (or more than two) of the systems. The transaction modifies certain data items in the application database. In HPE NonStop systems, the NonStop Transaction Management Facility (TMF) appends these database changes to an Audit Trail, though other manufacturers have similar facilities.

A HIE function called the Coordinator joins the transaction so that it can be a voting party to the transaction. Using the changes recorded in the Audit Trail (or other journal or operation event access method such as intercepts as may be provided or made available by the system), a HIE function called the Extractor reads the Audit Trail and sends select Audit Trail data to a HIE function called a Consumer. The Consumer computes the indicia for the transaction from the changes to be made by the transaction to the database (but does not need to actually modify the source or target database). These indicia may be the new values of the modified data items in the database, or they may be a hash of the new values. The HIE (typically one of the mentioned HIE functions—preferably the Coordinator) then communicates the indicia to the HIE residing on the other system(s) as shown in FIG. 27 and/or the Parent Node (typically the Transaction Duplicator process) as shown in FIG. 28.

Note that the Coordinator, Extractor, and Consumer can be independent executables or all reside in the same executable or program module sub-processes or threads.

If the indicia match, then it is known that each system has processed the transaction in a like manner; and the Coordinator votes to commit the transaction. If the indicia do not match, the Coordinator votes to abort the transaction and the transaction is aborted. The decision to commit or abort and/or the final outcome of the transaction may optionally be shared between the HIE's and the commit vote held up until the decision by the corresponding HIE is known. Sharing the decision will also help identify situations where one node ends up aborting a transaction due to extraneous factors such as a disk failure.

Thus, this method guarantees that there will be no erroneous updates made to the application database. It does this without making any changes to the application. This means that the HIE can be added to any application environment that uses transactions without having to make changes to the application.

FIG. 29 shows a flowchart for the case in which indicia matching is done by the Coordinators. FIG. 30 shows a flowchart for the case in which indicia matching is done by the Transaction Duplicator.

1.21 Scaling to the ISC Cloud

The applications can be deployed into a cloud environment. This provides scalability to the applications, as the cloud will assign additional processing resources and data storage resources as needed by the applications. The cloud will also recover unneeded resources from the applications as they become available.

Since the applications that are deployed to the cloud are redundant pairs, high availability is achieved. Along with the indicia matching method of this invention, this configuration provides the attributes of RAS—Reliability (data integrity), Availability, and Scalability.

To increase availability even further, the two sets of redundant applications can be deployed in different clouds to protect against a cloud failure.

The reliability (data integrity) of updates to a database can be ensured by providing two systems that generate indicia representing the changes to the database to be made by a transaction. The indicia are exchanged between the two systems. If they agree, the transaction can be committed by both systems. If they disagree, the transaction should be aborted.

This architecture is indestructible as it employs redundant systems. The application can survive any single failure in the systems. If the application is deployed to the cloud, it is scalable as the cloud will provide any additional resources needed by the application. As such, this architecture not only ensures data integrity, but it satisfies the requirements for indestructible scalable computing. Furthermore, it accomplishes these goals with no changes to the application.

SUMMARY

A computing system can be initially implemented with unintended bugs or modified during manufacture to provide malicious results that would go undetected during normal operation. Alternatively, a properly operating system can be infected by malware that would cause it to deliver malicious results.

A Heterogeneous Indicia Engine (HIE) can be deployed to protect against such unintended or malicious results. An HIE system comprises two or more subsystems. Each subsystem is presumed to be providing the same services. However, the hardware, firmware, and software of each subsystem are developed independently by different groups and are obtained from different manufacturers. It is important that no common point of manufacture exists. For instance, the software or firmware of the two systems should not use a common routine that has been developed by another manufacturer that itself could be malicious. The hardware design can be further protected by having different groups design the various layers in the chips with their photo masks used by different manufacturers to fabricate the chips.

Two or more independently manufactured subsystems operate in parallel, processing the same inputs. Their outputs are compared by having each subsystem use an Indicia Engine to generate indicia representing its output and sending its indicia to the other subsystem(s). Using the embedded Indicia Engine, each subsystem compares its indicia with that of the other system(s). It is expected that all indicia will be the same. If there is an output mismatch, one (or more) of the subsystems is misbehaving. This could be because of a design or implementation error in the hardware, firmware, or software of the subsystem(s), it could be due to a hardware failure, it could be because of a malicious design, or could be that one or more of the subsystem(s) has been infected with malware.

In a DMR configuration in which there are only two subsystems, it is not known which subsystem is at fault. The subsystems could perform self-diagnostics to determine if they were faulty, and any subsystem that failed its self-diagnostics would take itself offline. If there were no self-diagnostic capability, or if both subsystems passed their diagnostic tests, both subsystems would be taken offline until the fault was determined.

In a TMR configuration in which there are three subsystems, or in an HIE configuration with more than three subsystems, the majority wins. The subsystems that generated the indicia matched by the majority of other subsystems remain in service, and the other subsystems are taken offline.

In a transaction-processing system, the subsystems process each transaction; and the indicia is based on the set of database changes that will be made to the database. In a verify-before-commit configuration, each subsystem computes its database updates and then enters the verification process in which it compares its indicia to those of the other subsystems before continuing on with its commit or abort. In a commit-before-verify configuration, both subsystems commit their transactions and then send their indicia for comparison. If the comparison fails, each subsystem rolls back the transaction.

The HIE method can also be used to certify that a new or upgraded system is operating properly. The new or upgraded system is included in an HIE configuration with a known good system (a trusted system). If it performs without error, it can be certified as trusted. If it fails a comparison, further offline tests can determine the source of the error so that it can be rectified in the subsystem's design and implementation.

Because each subsystem in an HIE configuration does its own comparison of the indicia, no LSU is required. The LSU single point of failure is eliminated.

It will be appreciated by those skilled in the art that changes could be made to the embodiments described above without departing from the broad inventive concept thereof.

It is understood, therefore, that this invention is not limited to the particular embodiments disclosed, but it is intended to cover modifications within the spirit and scope of the present invention.

What is claimed is:

1. A method of ensuring transactional integrity of a system that includes a first subsystem and a second subsystem, each subsystem including (i) a hardware processor, (ii) an application executing in the hardware processor, (iii) an indicia engine, and (iv) an instance of a database used by the application, each subsystem executing transactions, each transaction including a BEGIN step, and one or more data manipulation language (DML) or data definition language (DDL) operations, the system performing the method comprising:
  (a) receiving at the first subsystem a request to process a transaction;
  (b) the first subsystem sending to the second subsystem the request to process a transaction;
  (c) processing in the application executing in the hardware processor at each subsystem the identical request in the instance of the subsystem's database;
  (d) the indicia engine at each subsystem computing indicia of the outcome of the processing of the identical request in step (b), wherein the indicia is dependent upon at least a subset of the DML or DDL operations;
  (e) the indicia engine at the second subsystem sending its computed indicia to the first subsystem; and
  (f) the indicia engine at the first subsystem:
    (i) comparing its computed indicia with the indicia received from the second subsystem, and
    (ii) sending a transaction abort directive to the second subsystem when the comparison indicates that the computed indicia of the second subsystem does not match the computed indicia of the first subsystem, thereby indicating a lack of transactional integrity in one or both of the first and second subsystems.

2. The method of claim 1 wherein the system includes a replication engine, and wherein in step (b), the first subsystem sends to the second subsystem the request to process a transaction using the replication engine.

3. The method of claim 1 wherein the system includes a replication engine, and wherein in step (e), the indicia engine at the second subsystem sends its computed indicia to the first subsystem using the replication engine.

4. The method of claim 1 further comprising:
  (g) aborting the transaction on the first subsystem when the comparison indicates that the computed indicia of the second subsystem does not match the computed indicia of the first subsystem, thereby indicating a lack of transactional integrity in one or both of the first and second subsystems.

\* \* \* \* \*